(12) United States Patent
Sano et al.

(10) Patent No.: US 8,107,346 B2
(45) Date of Patent: Jan. 31, 2012

(54) OPTICAL HEAD DEVICE AND OPTICAL INFORMATION PROCESSING DEVICE

(75) Inventors: Kousei Sano, Osaka (JP); Yoshiaki Komma, Osaka (JP); Shin-ichi Kadowaki, Hyogo (JP)

(73) Assignee: Panasonic Corporation, Osaka (JP)

( * ) Notice: Subject to any disclaimer, the term of this patent is extended or adjusted under 35 U.S.C. 154(b) by 936 days.

(21) Appl. No.: 11/912,469

(22) PCT Filed: Apr. 24, 2006

(86) PCT No.: PCT/JP2006/308573
§ 371 (c)(1),
(2), (4) Date: Oct. 24, 2007

(87) PCT Pub. No.: WO2006/118082
PCT Pub. Date: Nov. 9, 2006

(65) Prior Publication Data
US 2009/0028035 A1    Jan. 29, 2009

(30) Foreign Application Priority Data

Apr. 27, 2005  (JP) ................. 2005-129268

(51) Int. Cl.
*G11B 7/00* (2006.01)
(52) U.S. Cl. .................. 369/112.03; 369/44.23; 369/94; 369/53.28; 369/112.15
(58) Field of Classification Search .............. 369/44.23, 369/44.32, 94, 53.28, 112.03, 112.15
See application file for complete search history.

(56) References Cited

U.S. PATENT DOCUMENTS

| 4,817,074 A | * | 3/1989 | Yamanaka | ................ 369/44.24 |
| 5,159,589 A | | 10/1992 | Ohsato | |
| 5,278,401 A | | 1/1994 | Takishima et al. | |

(Continued)

FOREIGN PATENT DOCUMENTS

JP    03-005927    1/1991

(Continued)

OTHER PUBLICATIONS

Chinese Office Action for corresponding application No. 200680014781.3 issued May 8, 2009 (with English Translation).

(Continued)

*Primary Examiner* — Wayne Young
*Assistant Examiner* — Brenda Bernardi
(74) *Attorney, Agent, or Firm* — Renner, Otto, Boisselle & Sklar, LLP

(57) ABSTRACT

An optical head device according to the present invention includes a splitting section for splitting a light beam having been reflected from an optical storage medium. The splitting section includes: a first main region transmitting a first interfering portion; a second main region transmitting a second interfering portion; and first and second sub-regions through which the first interfering portion is transmitted with a lower rate than in the first main region and through which the second interfering portion is transmitted with a lower rate than in the second main region. The splitting section splits the reflected light beam into: a first main light beam transmitted through the first main region; a second main light beam transmitted through the second main region; a first sub-light beam transmitted through the first sub-region; and a second sub-light beam transmitted through the second sub-region. The splitting section further includes a swapping section for swapping a portion of the first sub-light beam with a portion of the second sub-light beam.

15 Claims, 26 Drawing Sheets

U.S. PATENT DOCUMENTS

| | | |
|---|---|---|
| 6,185,167 B1 | 2/2001 | Arai et al. |
| 6,212,150 B1 * | 4/2001 | Inoue et al. ............... 369/112.04 |
| 6,256,281 B1 * | 7/2001 | Tanaka et al. ................. 369/103 |
| 6,407,967 B1 | 6/2002 | Odajima et al. |
| 6,754,154 B1 * | 6/2004 | Takeda et al. ............... 369/53.19 |
| 6,760,288 B2 * | 7/2004 | Ijtsma et al. ............... 369/53.18 |
| 6,859,428 B2 * | 2/2005 | Mizuno et al. ........... 369/112.01 |
| 7,095,682 B2 * | 8/2006 | Shibano et al. ............ 369/44.14 |
| 7,227,819 B2 | 6/2007 | Kadowaki et al. |
| 7,272,083 B2 * | 9/2007 | Takeshita ................... 369/44.23 |
| 7,483,359 B2 * | 1/2009 | Sun ........................ 369/112.28 |
| 7,693,025 B2 * | 4/2010 | Nakano et al. ........... 369/112.02 |
| 7,706,216 B2 | 4/2010 | Arai |
| 2001/0019520 A1 * | 9/2001 | Uemura et al. ............ 369/44.23 |
| 2002/0075774 A1 * | 6/2002 | Matsuura ................... 369/44.32 |
| 2004/0062158 A1 * | 4/2004 | Arai et al. .................. 369/44.32 |
| 2005/0161579 A1 | 7/2005 | Kim et al. |
| 2005/0162995 A1 * | 7/2005 | Fukasawa et al. ......... 369/44.23 |
| 2005/0169152 A1 * | 8/2005 | Miyake et al. ........... 369/112.15 |
| 2005/0185539 A1 * | 8/2005 | Shimano et al. ........... 369/44.37 |
| 2005/0265204 A1 * | 12/2005 | Sakai ....................... 369/112.03 |
| 2006/0233068 A1 * | 10/2006 | Shibano et al. ............ 369/44.14 |
| 2007/0109946 A1 * | 5/2007 | Hiraga et al. ............ 369/112.05 |

FOREIGN PATENT DOCUMENTS

| | | | |
|---|---|---|---|
| JP | 04-001933 | | 1/1992 |
| JP | 04-119531 | | 4/1992 |
| JP | 04119531 A | * | 4/1992 |
| JP | 05-047016 | | 2/1993 |
| JP | 05151593 A | * | 6/1993 |
| JP | 08-306057 | | 11/1996 |
| JP | 08306057 A | * | 11/1996 |
| JP | 11-073658 | | 3/1999 |
| JP | 11-353670 | | 12/1999 |
| JP | 2005-203090 | | 7/2005 |
| WO | 2004/042714 A1 | | 5/2004 |

OTHER PUBLICATIONS

International Search Report for corresponding Application No. PCT/JP2006/308573 dated May 23, 2006.

PCT/ISA/237 and partial English translation.

Notice of Reasons for Rejection, corresponding Japanese Application 2007-514720, mailed Jul. 5, 2011, English translation.

* cited by examiner

Direction of Move 153

CONVENTIONAL ART

CONVENTIONAL ART

CONVENTIONAL ART

US 8,107,346 B2

OPTICAL HEAD DEVICE AND OPTICAL INFORMATION PROCESSING DEVICE

TECHNICAL FIELD

The present invention relates to an optical head device for performing optical recording and/or reproduction of data, and an optical information processing device having the optical head device mounted therein.

BACKGROUND ART

In recent years, as a high-density and large-capacity storage medium, a high-density and large-capacity optical disk medium called DVD (Digital Versatile Disc) has been put to practical use, and is widely prevalent as an information storage medium on which a large amount of information, e.g., moving pictures, can be recorded. On such an information storage medium, information is recorded with marks and spaces.

With reference to FIG. 26, a conventional optical head device will be described. FIG. 26 is a diagram showing a conventional optical head device 300.

The optical head device 300 is mounted in an optical information processing device (not shown) which performs recording/reproduction of information. In this optical information processing device, an optical storage medium 21 is irradiated with three light beams for detecting a tracking error signal (see, for example, Patent Document 1).

With reference to FIG. 26, a light source 1 such as a semiconductor laser element emits a divergent light beam 10 of linearly polarized light having a wavelength λ of 405 nm. The divergent light beam 10 having been emitted from the light source 1 is converted into collimated light by a collimating lens 11 having a focal length f1 of 15 mm, and thereafter enters a diffraction grating 12. The light beam 10 having irradiated the diffraction grating 12 is split into three light beams of $0^{th}$ and $\pm 1^{st}$ order diffracted light. The $0^{th}$ order diffracted light is a main light beam 10a with which to perform recording/reproduction of information. The $\pm 1^{st}$ order diffracted light is two sub-light beams 10b and 10c to be used for a differential push-pull (hereinafter referred to as DPP) technique for detecting a tracking error (hereinafter referred to as TE) signal.

In the diffraction grating 12, in order to avoid unwanted recording occurring with the sub-light beams, the ratio of diffraction efficiencies between the $0^{th}$ order diffracted light 10a and either $1^{st}$ order diffracted light 10b or 10c is usually set to 10:1 to 20:1, and herein is 20:1. The three light beams 10a to 10c having been generated in the diffraction grating 12 are transmitted through a polarization beam splitter 13, transmitted through a ¼ wavelength plate 14 so as to be converted into circularly polarized light, and then converted into convergent light beam by an objective lens 15 having a focal length f2 of 2 mm, transmitted through a transparent substrate 21a of the optical storage medium 21, and converged onto an information recording layer 21c. The optical storage medium 21 includes two information recording layers 21b and 21c. In FIG. 26, the light beam 10 having been converged by the objective lens 15 comes to a focal point at the information recording layer 21c.

It is assumed that there is a distance d2 of 100 μm from the light incident surface of the optical storage medium 21 to the information recording layer 21c, and that there is a distance d1 of 25 μm between the information recording layer 21b and the information recording layer 21c. The tracks which are formed in the information recording layers 21b and 21c have a period tp (FIG. 27) of 0.32 μm. The opening of the objective lens 15 is restricted through the aperture 16, with a numerical aperture NA of 0.85. The transparent substrate 21a has a thickness of 0.1 mm and a refractive index n of 1.62. The information recording layers 21b and 21c each have an equivalent reflectance of about 4 to 8%. Herein, an equivalent reflectance represents the light amount of a light beam which, after being reflected at the information recording layer 21b or 21c, again goes out from the optical storage medium 21, assuming that the light beam entering the optical storage medium 21 has a light amount of 1. Although the information recording layer 21c absorbs or reflects most of the light amount of the incident light beam, the information recording layer 21b transmits about 50% of the light amount of the incident light beam, while absorbing or reflecting the other 50% light amount, thus allowing the light beam to reach the information recording layer 21c.

FIG. 27 is a diagram showing relative positioning of light beams and tracks on the information recording layer 21c. A continuous groove to become the tracks is formed on the information recording layers 21b and 21c, and information is to be recorded in the groove. Tracks Tn−1, Tn and Tn+1 have a track pitch tp of 0.32 μm. When the main light beam 10a is converged on the track Tn, the sub-light beam 10b is converged between the track Tn−1 and the track Tn, and the sub-light beam 10c is converged between the track Tn and the track Tn+1. There is an interval L of 0.16 μm between the main light beam 10a and the sub-light beams 10b and 10c along a direction which is orthogonal to the tracks.

The light beams 10a to 10c having been reflected from the information recording layer 21c are transmitted through the objective lens 15 and the ¼ wavelength plate 14 so as to be converted into linearly polarized light which has a 90° difference with respect to the forward path, and thereafter are reflected by the polarization beam splitter 13. The light beams 10a to 10c having been reflected by the polarization beam splitter 13 are transmitted through a converging lens 25 having a focal length f3 of 30 mm so as to be converted into convergent light, and enter a photodetector 30 via a cylindrical lens 26. When being transmitted through the cylindrical lens 26, astigmatism is imparted to the light beams 10a to 10c.

FIG. 28 is a diagram showing relative positioning of the photodetector 30 and the light beams 10a to 10c. The photodetector 30 includes eight photosensitive portions 30a to 30h, such that: the photosensitive portions 30a to 30d receive the light beam 10a; the photosensitive portions 30e to 30f receive the light beam 10b; and the photosensitive portions 30g to 30h receive the light beam 10c. The photosensitive portions 30a to 30h output electrical signals I30a to I30h (not shown), respectively, which are in accordance with the received light amounts. A focus error (hereinafter referred to as FE) signal is obtained through a calculation according to astigmatism technique, employing the signals I30a to I30d having been output from the photodetector 30. For example, an FE signal is obtained through the calculation of (I30a+I30c)−(I30b+I30d). Moreover, a TE signal is obtained through a calculation according to DPP technique. For example, a TE signal is obtained through the calculation of {(I30a+I30d)−(I30b+I30c)}−C·{(I30e+I30g)−(I30f+I30h)}. Herein, C is a coefficient which is determined by a ratio of diffraction efficiencies, at the diffraction grating 12, between the $0^{th}$ order diffracted light and either $1^{st}$ order diffracted light. The FE signal and the TE signal are subjected to desired levels of amplification and phase compensation, and thereafter supplied to actuators 31 and 32 for moving the objective lens 15, whereby focus control and tracking control are performed. Moreover, a reproduction signal (hereinafter referred to as RF signal)

representing the information which is recorded in the information recording layer 21c is obtained through the calculation of I30a+I30b+I30c+I30d.

[Patent Document 1] Japanese Laid-Open Patent Publication No. 3-005927 (pp. 5 to 8, FIG. 2)

DISCLOSURE OF INVENTION

Problems to be Solved by the Invention

However, in the case of using an optical storage medium having a plurality of information recording layers, light beams having been reflected at the information recording layer (s) other than the desired information recording layer may enter the photodetector. Light beams 40a to 40c are light beams which enter the photodetector 30 as a result of the light beams 10a to 10c being reflected by the information recording layer 21b. At this time, the light beam 40a and the light beam 10b overlap, and the light beam 40a and the light beam 100 overlap, whereby a lightness/darkness distribution due to interference occurs. This lightness/darkness distribution due to interference fluctuates depending on the flutter of the optical storage medium 21 or local variations in thickness of the transparent substrate 21a, and affects the TE signal. The light beams 10b and 10c are sub-light beams, whereas the light beam 40a is the main light beam. Since the sub-light beams 10b and 10c are smaller in light amount than the main light beam 10a, the interference between the light beam 40a and the light beam 10b and the interference between the light beam 40a and the light beam 10c are the interferences that result in the greatest changes in lightness/darkness.

FIG. 29 is a diagram showing an oscilloscope observation of a TE signal according to DPP technique, which is obtained when scanning the light beams 10a to 10c along a direction which is orthogonal to the track. When detecting a TE signal with the aforementioned conventional optical head device, there are large fluctuations in the amplitude and symmetry of the TE signal. When tracking control is performed by using this TE signal, there is a problem in that tracking control becomes unstable and makes it difficult to record and reproduce information with a high reliability.

The present invention has been made in view of the aforementioned problem, and an objective thereof is to provide an optical head device and optical information processing device which can reduce fluctuations in the TE signal amplitude and which can record and reproduce information with a high reliability.

Means for Solving the Problems

An optical head device according to the present invention is an optical head device comprising: a light source for emitting a light beam; a converging section for converging the light beam onto an optical storage medium having a track; a splitting section for splitting the light beam having been reflected from the optical storage medium; and a photodetection section for receiving the split light beams and outputting signals which are in accordance with received light amounts, wherein, the reflected light beam contains $0^{th}$ order diffracted light, $+1^{st}$ order diffracted light and $-1^{st}$ order diffracted light; the reflected light beam includes a first interfering portion in which the $0^{th}$ order diffracted light interferes with the $+1^{st}$ order diffracted light and a second interfering portion in which the $0^{th}$ order diffracted light interferes with the $-1^{st}$ order diffracted light; the splitting section includes a first main region transmitting the first interfering portion, a second main region transmitting the second interfering portion, and first and second sub-regions through which the first interfering portion is transmitted with a lower rate than in the first main region and through which the second interfering portion is transmitted with a lower rate than in the second main region; the first sub-region and the second sub-region are divided by a split line extending in a longitudinal direction of the first and second interfering portions in a cross section of the reflected light beam; the splitting section splits the reflected light beam into a first main light beam transmitted through the first main region, a second main light beam transmitted through the second main region, a first sub-light beam transmitted through the first sub-region, and a second sub-light beam transmitted through the second sub-region; and the splitting section further includes a swapping section for swapping a portion of the first sub-light beam with a portion of the second sub-light beam.

In one embodiment, the photodetection section comprises a first photosensitive portion, a second photosensitive portion, a third photosensitive portion, and a fourth photosensitive portion; the first main light beam enters the first photosensitive portion; the second main light beam enters the second photosensitive portion; the first sub-light beam and the swapped portion of the second sub-light beam enter the same third photosensitive portion; and the second sub-light beam and the swapped portion of the first sub-light beam enter the same fourth photosensitive portion.

In one embodiment, the split line passes through a position on the splitting section through which a central portion of the cross section of the reflected light beam is transmitted.

In one embodiment, the splitting section further includes a center dummy region through which a central portion of the cross section of the reflected light beam is transmitted; the splitting section further splits the reflected light beam into a dummy light beam having been transmitted through the center dummy region; and the dummy light beam does not enter the first to fourth photosensitive portions.

In one embodiment, a pair of said swapping sections is comprised, wherein, one of the swapping sections is positioned between the first main region and the center dummy region; and the other swapping section is positioned between the second main region and the center dummy region.

An optical information processing device according to the present invention comprises: the aforementioned optical head device; and a control section for controlling the optical head device based on signals which are output from the photosensitive portions.

An optical information processing device according to the present invention comprises: the aforementioned optical head device; and a control section for controlling the optical head device based on signals which are output from the photosensitive portions, wherein, the first photosensitive portion entered by the first main light beam outputs a first signal which is in accordance with a received light amount; the second photosensitive portion entered by the second main light beam outputs a second signal which is in accordance with a received light amount; the third photosensitive portion entered by the first sub-light beam and the swapped portion of the second sub-light beam outputs a third signal which is in accordance with a received light amount; the fourth photosensitive portion entered by the second sub-light beam and the swapped portion of the first sub-light beam outputs a fourth signal which is in accordance with a received light amount; and the optical information processing device further comprises a generation section for generating a tracking error signal, the generation section including a first differential calculation section for calculating a difference between the first signal and the second signal to generate a first differential signal, a second differential calculation section for calculating a difference between the third signal and the fourth signal to generate a second differential signal, an adjustment section for adjusting a gain of at least one of the first differential signal and the second differential signal, and a third differential calculation section for calculating a difference between the first differential signal and the second differential signal to generate a third differential signal.

An optical head device according to the present invention is an optical head device comprising: a light source for emitting a light beam; a converging section for converging the light beam onto an optical storage medium having a track; a splitting section for splitting the light beam having been reflected from the optical storage medium; and a photodetection section for receiving the split light beams and outputting signals which are in accordance with received light amounts, wherein, the reflected light beam contains $0^{th}$ order diffracted light, $+1^{st}$ order diffracted light and $-1^{st}$ order diffracted light; the reflected light beam includes a first interfering portion in which the $0^{th}$ order diffracted light interferes with the $+1^{st}$ order diffracted light and a second interfering portion in which the $0^{th}$ order diffracted light interferes with the $-1^{st}$ order diffracted light; the splitting section includes a first main region transmitting the first interfering portion, a second main region transmitting the second interfering portion, and first and second sub-regions through which the first interfering portion is transmitted with a lower rate than in the first main region and through which the second interfering portion is transmitted with a lower rate than in the second main region; the first sub-region and the second sub-region are divided by a split line extending in a longitudinal direction of the first and second interfering portions in a cross section of the reflected light beam; the splitting section further includes a center dummy region through which a central portion of the cross section of the reflected light beam is transmitted; the center dummy region is surrounded by the first and second main regions and the first and second sub-regions; the splitting section splits the reflected light beam into a first main light beam transmitted through the first main region, a second main light beam transmitted through the second main region, a first sub-light beam transmitted through the first sub-region, a second sub-light beam transmitted through the second sub-region, and a dummy light beam transmitted through the center dummy region; the photodetection section includes a first photosensitive portion, a second photosensitive portion, a third photosensitive portion, and a fourth photosensitive portion; the first main light beam enters the first photosensitive portion; the second main light beam enters the second photosensitive portion; the first sub-light beam enters the third photosensitive portion; the second sub-light beam enters the fourth photosensitive portion; and the dummy light beam does not enter the first to fourth photosensitive portions.

An optical information processing device according to the present invention comprises: the aforementioned optical head device; and a control section for controlling the optical head device based on signals which are output from the photosensitive portions.

In one embodiment, the first photosensitive portion entered by the first main light beam outputs a first signal which is in accordance with a received light amount; the second photosensitive portion entered by the second main light beam outputs a second signal which is in accordance with a received light amount; the third photosensitive portion entered by the first sub-light beam outputs a third signal which is in accordance with a received light amount; the fourth photosensitive portion entered by the second sub-light beam outputs a fourth signal which is in accordance with a received light amount; and the device further comprises a generation section for generating a tracking error signal, the generation section including a first differential calculation section for calculating a difference between the first signal and the second signal to generate a first differential signal, a second differential calculation section for calculating a difference between the third signal and the fourth signal to generate a second differential signal, an adjustment section for adjusting a gain of at least one of the first differential signal and the second differential signal, and a third differential calculation section for calculating a difference between the first differential signal and the second differential signal to generate a third differential signal.

An optical head device according to the present invention is an optical head device comprising: a light source for emitting a light beam; a diffraction section for generating a plurality of diffracted light beams from the light beam; a converging section for converging the plurality of diffracted light beams onto an optical storage medium; a splitting section for splitting the plurality of diffracted light beams having been reflected from the optical storage medium; and a photodetection section for receiving the plurality of split diffracted light beams and outputting signals which are in accordance with received light amounts, wherein, the plurality of diffracted light beams include a main light beam which is $0^{th}$ order diffracted light and first and second sub-light beams which are $1^{st}$ order or any higher-order diffracted light; and the optical head device further comprises a partial light shielding section provided in an optical path between the light source and the converging section to block a portion of the main light beam.

In one embodiment, the partial light shielding section blocks a portion including a central portion of a cross section of the main light beam.

In one embodiment, the optical storage medium includes a plurality of recording layers; and the portion of the main light beam blocked by the partial light shielding section corresponds to a portion of the main light beam to enter a photosensitive portion of the photodetection section after having been reflected by a recording layer other than a predetermined recording layer when a focal point of the main light beam is set to the predetermined recording layer.

In one embodiment, the partial light shielding section blocks two portions which are in symmetric positions with respect to a central portion of a cross section of the main light beam.

In one embodiment, the optical storage medium includes a plurality of recording layers; the photodetection section includes a first photosensitive portion and second and third photosensitive portions which are in symmetric positions with respect to the first photosensitive portion; and the portion of the main light beam blocked by the partial light shielding section corresponds to portions of the main light beam to enter the second and third photosensitive portions after having been reflected by a recording layer other than a predetermined recording layer when a focal point of the main light beam is set to the predetermined recording layer.

In one embodiment, a collimating lens provided in an optical path between the light source and the partial light shielding section is further comprised, the collimating lens converting the light beam emitted from the light source into a collimated light beam, wherein, the partial light shielding section blocks a portion of the collimated light beam.

An optical information processing device according to the present invention comprises: the aforementioned optical head device; and a control section for controlling the optical head device based on signals which are output from the photosensitive portions.

An optical head device according to the present invention is an optical head device comprising: a light source for emitting a light beam; a diffraction section for generating a plurality of diffracted light beams from the light beam; a converging section for converging the plurality of diffracted light beams onto an optical storage medium; a splitting section for splitting the plurality of diffracted light beams having been reflected from the optical storage medium; and a photodetection section for receiving the plurality of split diffracted light beams and outputting signals which are in accordance with received light amounts, wherein, the plurality of diffracted light beams include a main light beam which is $0^{th}$ order diffracted light and first and second sub-light beams which are $1^{st}$ order or any higher-order diffracted light; and the diffraction section includes a first partial diffraction section generating more of the main light beam than the first and second sub-light beams, and a second partial diffraction section generating more of the first and second sub-light beams than the main light beam.

In one embodiment, a pair of said second partial diffraction sections is comprised, wherein, the pair of second partial diffraction section are in symmetric positions with respect to a central portion of a cross section of the light beam entering the diffraction section.

An optical information processing device according to the present invention comprises: the aforementioned optical head device; and a control section for controlling the optical head device based on signals which are output from the photosensitive portions.

An optical head device according to the present invention is an optical head device comprising: a light source for emitting a light beam; a diffraction section for generating a plurality of diffracted light beams from the light beam; a converging section for converging the plurality of diffracted light beams onto an optical storage medium; a splitting section for splitting the plurality of diffracted light beams having been reflected from the optical storage medium; and a photodetection section for receiving the plurality of split diffracted light beams and outputting signals which are in accordance with received light amounts, wherein, the plurality of diffracted light beams include a main light beam which is $0^{th}$ order diffracted light and first and second sub-light beams which are $1^{st}$ order or any higher-order diffracted light; the diffraction section includes a first partial diffraction section generating more of the main light beam than the first and second sub-light beams, and a second partial diffraction section generating the main light beam with a higher rate than the first partial diffraction section; and the second partial diffraction section is placed in a position where a central portion of a cross section of the light beam entering the diffraction section passes through.

In one embodiment, no diffraction grating is provided in the second partial diffraction section.

An optical information processing device according to the present invention comprises: the aforementioned optical head device; and a control section for controlling the optical head device based on signals which are output from the photosensitive portions.

An optical head device according to the present invention is an optical head device to be mounted in an apparatus for generating a tracking error signal by using a main light beam and a sub-light beam, the optical head device including: a first light source for emitting the main light beam; a second light source for emitting the sub-light beam; a converging section for converging the main light beam and the sub-light beam onto an optical storage medium; a splitting section for splitting the main light beam and the sub-light beam having been reflected from the optical storage medium; and a photodetection section for receiving the split main light beams and sub-light beams and outputting signals which are in accordance with received light amounts, wherein, the main light beam and the sub-light beam have different wavelengths.

An optical information processing device according to the present invention comprises: the aforementioned optical head device; and a control section for controlling the optical head device based on signals which are output from the photosensitive portions.

An optical head device according to the present invention is an optical head device comprising: a light source for emitting a light beam; a diffraction section for generating a plurality of diffracted light beams from the light beam; a converging section for converging the plurality of diffracted light beams onto an optical storage medium; a splitting section for splitting the plurality of diffracted light beams having been reflected from the optical storage medium; and a photodetection section for receiving the plurality of split diffracted light beams and outputting signals which are in accordance with received light amounts, wherein, the diffraction section includes a diffraction grating; and the optical head device further includes a swing section for causing the diffraction section to swing in a direction which is perpendicular to a direction along which grooves of the diffraction grating extend.

The optical information processing device according to the present invention comprises: the aforementioned optical head device; and a control section for controlling the optical head device based on signals which are output from the photosensitive portions.

An optical head device according to the present invention is an optical head device comprising: a light source for emitting a light beam; a diffraction section for generating a plurality of diffracted light beams from the light beam; a converging section for converging the plurality of diffracted light beams onto an optical storage medium; a splitting section for splitting the plurality of diffracted light beams having been reflected from the optical storage medium; and a photodetection section for receiving the plurality of split diffracted light beams and outputting signals which are in accordance with received light amounts, wherein, the optical storage medium includes a plurality of recording layers; and $2 \cdot d \cdot n > L$ is satisfied, where L is a coherence length of the light beam emitted from the light source; d is a distance between two recording layers; and n is a refractive index of a medium which is located between the two recording layers.

An optical information processing device according to the present invention comprises: the aforementioned optical head device; and a control section for controlling the optical head device based on signals which are output from the photosensitive portions.

EFFECTS OF THE INVENTION

According to the present invention, a splitting section of the optical head device includes a first main region transmitting a first interfering portion of a light beam, a second main region transmitting a second interfering portion, and first and second sub-regions through which the first interfering portion is transmitted with a lower rate than in the first main region and through which the second interfering portion is transmitted with a lower rate than in the second main region. The splitting section splits the light beam into a first main light beam transmitted through the first main region, a second main light beam transmitted through the second main region, a first sub-light beam transmitted through the first sub-region, and a second sub-light beam transmitted through the second sub-region. The splitting section further includes a swapping section for swapping a portion of the first sub-light beam with a portion of the second sub-light beam. By swapping a portion of the first sub-light beam and a portion of the second sub-light beam entering the photodetection section, the amplitude fluctuation of a tracking error signal can be reduced. By stably detecting a tracking error signal, information can be recorded and reproduced with a high reliability.

Moreover, according to the present invention, the optical head device includes a partial light shielding section for blocking a portion of the main light beam. The partial light shielding section blocks a portion of the main light beam corresponding to a portion of the main light beam to enter a photosensitive portion of the photodetection section after having been reflected from a recording layer other than the recording layer to which the focal point is set. As a result, the amplitude fluctuation of a tracking error signal can be reduced. By stably detecting a tracking error signal, information can be recorded and reproduced with a high reliability.

DESCRIPTION OF THE REFERENCE NUMERALS

Figure 1:
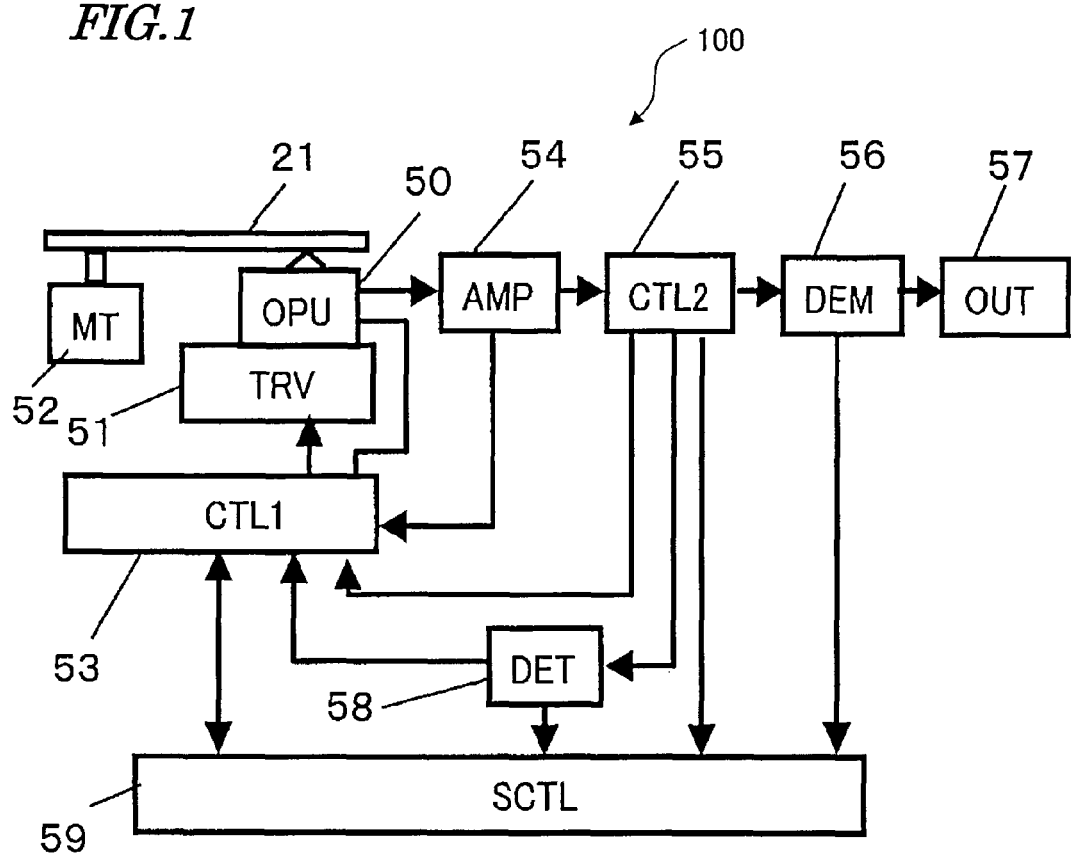
FIG. 1 A diagram showing an optical information processing device according to Embodiment 1 of the present invention.

1, 131, 141, 142, 161 light source
10, 10a to 10c, 132, 143, 144 light beam
11 collimating lens
12, 61, 121, 133, 151 diffraction grating
13, 63 polarization beam splitter
14 ¼ wavelength plate
15 objective lens
16 aperture
21 optical storage medium
21a transparent substrate
21b, 21c information recording layer
25, 64 detection lens
26, 65 cylindrical lens
30, 173 photodetector
30a to 30h photosensitive portion
31, 32 actuator
40a to 40c, 72a to 72c, 93a to 93c, 104a to 104c, 123a to 123c light beam
50, 110, 130, 140, 160 optical head device
51 transportation controller
52 motor
53 first control section 54 amplifier
55 second control section
56 demodulation section
57 output section
58 detection section
59 system control section
62, 91, 101 partial light shielding plate
66 high-frequency superposition element
71, 92, 102, 103 light shielding section
73, 94a, 105a, 106a, 124b, 124c light-shielded region
111 diffraction grating
112, 113 high-diffraction efficiency section
122 region
152 actuator
171 hologram element
171A, 171B main region
171B to 171H sub-region
172 diffracted light
175, 176 interference region
178 split line
200 hologram element
200A, 200B main region
200B to 200F sub-region
200G center region
201, 202, 203 split line

BEST MODE FOR CARRYING OUT THE INVENTION

Hereinafter, with reference to the drawings, embodiments of an optical head device and an optical information processing device according to the present invention will be described. Like constituent elements will be denoted by like reference numerals, and repetition of any similar descriptions will be omitted.

Embodiment 1

With reference to FIG. 1 to FIG. 4, a first embodiment of an optical head device and an optical information processing device according to the present invention will be described.

First, FIG. 1 is referred to. FIG. 1 is a diagram showing an optical information processing device 100 of the present embodiment. The optical information processing device 100 is a recording/reproduction apparatus, a reproduction apparatus, a recording apparatus, an editing apparatus, and so on, which performs optical recording of information onto an optical storage medium 21 and/or optical reproduction of information from the optical storage medium 21. The optical storage medium 21 is an optical disk medium.

The optical information processing device 100 includes: an optical head device 50 for irradiating the optical storage medium 21 with a light beam; a transportation controller 51 for moving the optical head device 50; a motor 52 for rotating the optical storage medium 21; an amplifier 54 for amplifying a signal; a demodulation section 56 for demodulating data; an output section 57 for outputting a signal; a detection section 58 for detecting an address signal or the like; and first and second control sections 53 and 55 and a system control section 59 for controlling the operation of the optical information processing device 100.

The optical head device 50 (also referred to as an optical pickup device) irradiates the optical storage medium 21 with a light beam having a wavelength λ of 405 nm, and performs reproduction of information which is recorded on the optical storage medium 21. The transportation controller 51 moves the optical head device 50 along a radial direction of the optical storage medium 21 in order to record or reproduce information at a desired position on the optical storage medium 21. The motor 52 drives and rotates the optical storage medium 21.

The first control section 53 controls the optical head device 50, the transportation controller 51, and the motor 53. The amplifier 54 amplifies output signals from the optical head device 50. From the output signals of the amplifier 54, the second control section 55 generates servo signals which are necessary when performing recording/reproduction of information for the optical storage medium 21, e.g., a focus error (hereinafter referred to as FE) signal and a tracking error (hereinafter referred to as TE) signal. The second control section 55 outputs the generated servo signals to the first control section 53. Moreover, although the signals which are input to the second control section 55 are analog signals, the second control section 55 digitizes (binarizes) these analog signals. The signals having been generated by the second control section 55 are output to the first control section 53, the demodulation section 56, the detection section 58, and the system control section 59.

The demodulation section 56 analyzes a digital signal which is output from the second control section 55 in order to reconstruct the original video data, music data, or the like. A reproduction signal which is generated through reconstruction is output from the output section 57. The detection section 58 detects an address signal and the like from a signal which is output from the second control section 55, and outputs it to the system control section 59.

Based on physical format information and optical storage medium manufacturing information (optical storage medium management information) which are read from the optical storage medium 21, the system control section 59 identifies the optical storage medium, deciphers recording/reproduction conditions and the like, and controls the entire optical information processing device 100.

When performing recording/reproduction of information for the optical storage medium 21, the first control section 53 drives and controls the transportation controller 51 in accordance with an instruction from the system control section 12. Thus, the transportation controller 51 moves the optical head device 50 to a desired position on the information recording layer 21c, and the optical head device 50 performs recording/reproduction of information for an information recording layer of the optical storage medium 21.

Figure 2:
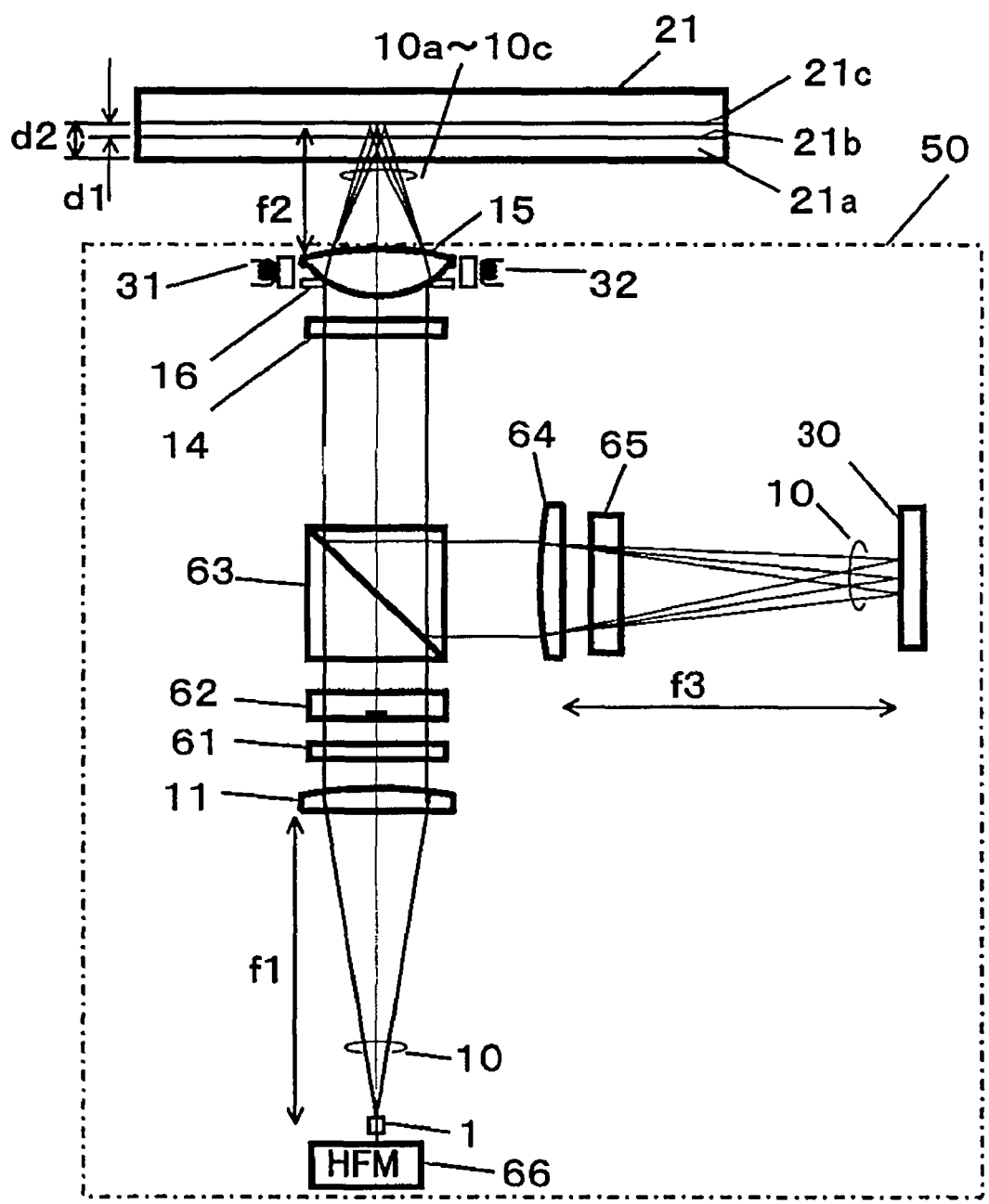
FIG. 2 A diagram showing an optical head device according to Embodiment 1 of the present invention.

Referring to FIG. 2, the optical head device 50 will be described in detail. FIG. 2 is a diagram showing the optical head device 50.

The optical head device 50 includes a light source 1, a collimating lens 11, a diffraction section 61, a partial light shielding plate 62, a polarization beam splitter 63, a ¼ wavelength plate 14, an objective lens 15, an aperture 16, actuators 31 and 32, a detection lens 64, a cylindrical lens 65, and a photodetector 30.

The light source 1, which is a semiconductor laser element or the like, emits a divergent light beam 10 which is linearly polarized light having a wavelength λ of about 405 nm. The divergent light beam 10 having been emitted from the light source 1 is converted into collimated light by the collimating lens 11 having a focal length f1 of 15 mm, and thereafter enters the diffraction section 61. The light beam 10 which has entered the diffraction section 61 having a diffraction grating is split into three light beams 10a, 10b and 10c, which are $0^{th}$ and $\pm 1^{st}$ order diffracted light. The $0^{th}$ order diffracted light is a main light beam 10a with which to perform recording/reproduction of information. The $\pm 1^{st}$ order diffracted light is two sub-light beams 10b and 10c to be used in a differential push-pull (hereinafter referred to as DPP) technique for detecting a TE signal. The sub-light beams 10b and 10c may be $1^{st}$ order or any higher-order diffracted light.

In the diffraction section 61, in order to avoid unwanted recording occurring with the sub-light beams, the ratio of diffraction efficiencies between the $0^{th}$ order diffracted light 10a and either $1^{st}$ order diffracted light 10b or 10c is usually set to 10:1 to 20:1, and herein is 20:1. The three light beams 10a to 10c having been generated in the diffraction section 61 are transmitted through the partial light shielding plate (partial light shielding section) 62, at which time a portion of each light beam is blocked (as will be described in detail later).

The light beams 10a to 10c having been transmitted through the partial light shielding plate 62 are transmitted through the polarization beam splitter 63, transmitted through the ¼ wavelength plate 14 so as to be converted into circularly polarized light, and thereafter converted into convergent light beam by the objective lens (converging section) 15 having a focal length f2 of 2 mm, transmitted through a transparent substrate 21a of the optical storage medium 21, and converged onto the information recording layer 21c. The optical storage medium 21 includes two information recording layers 21b and 21c. In FIG. 2, the light beam 10 having been converged by the objective lens 15 comes to a focal point at the information recording layer 21c. Note that, in the case of performing recording/reproduction of information for the information recording layer 21b, the light beam 10 will come to a focal point at the information recording layer 21b.

Figure 27:
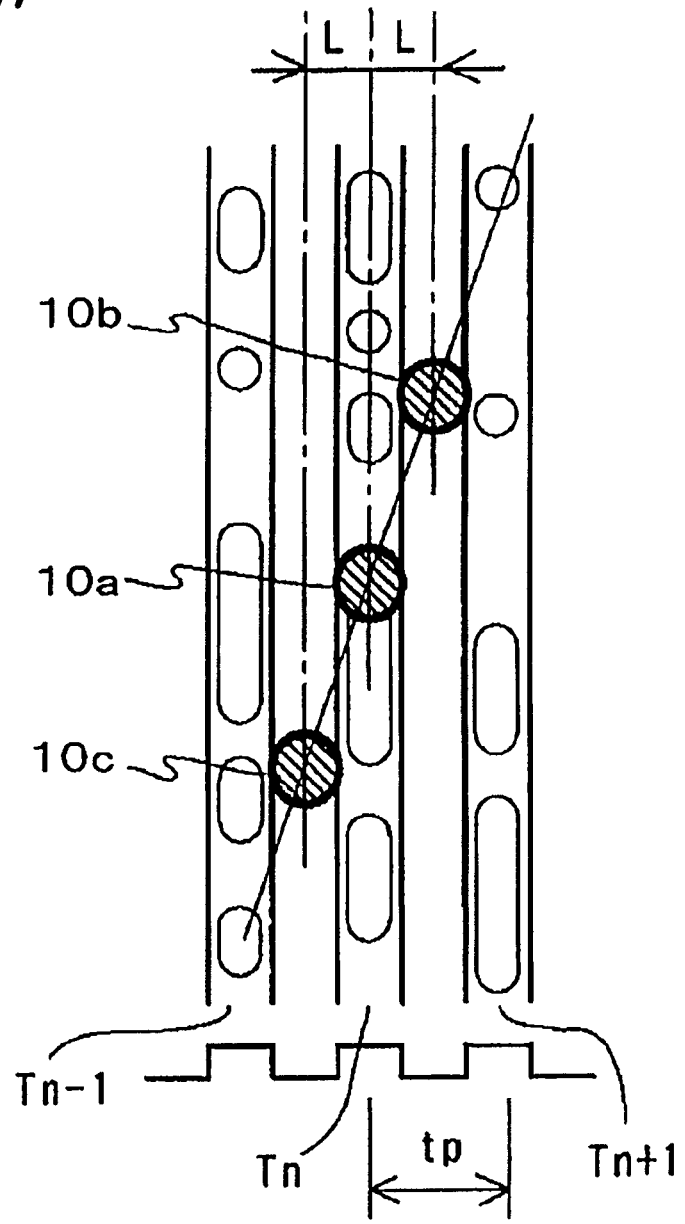
FIG. 27 A diagram showing a relationship between tracks and light beams on an optical storage medium.
Figure 28:
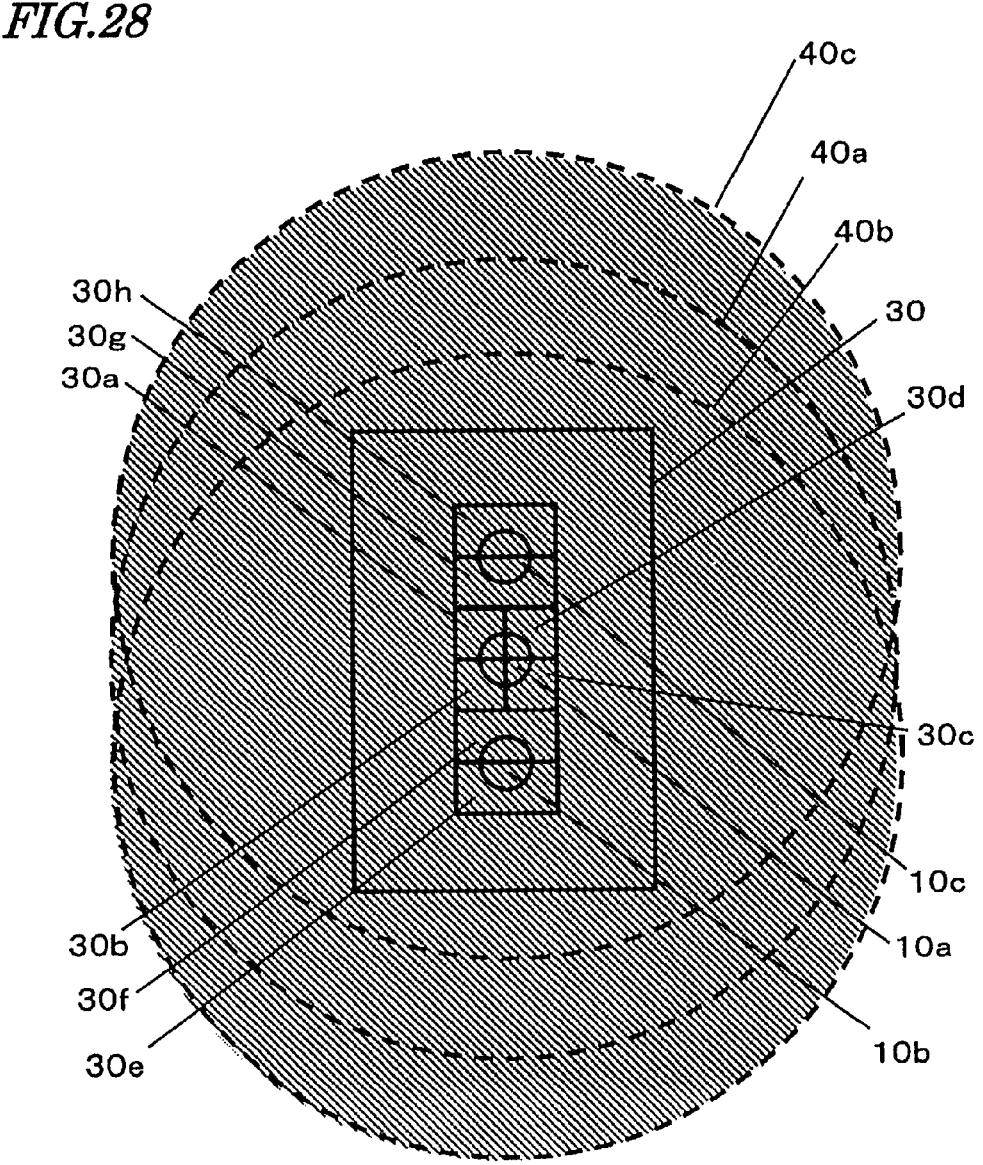
FIG. 28 A diagram showing a relationship between a conventional photodetector and light beams.
Figure 29:
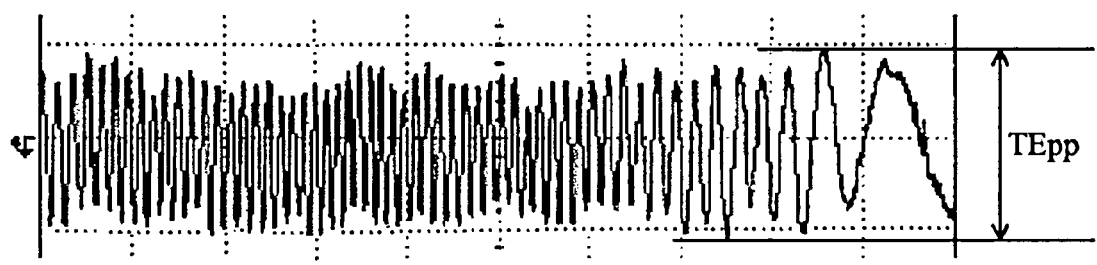
FIG. 29 A diagram showing behavior of a conventional TE signal.

It is assumed that there is a distance d2 of 100 μm from the light incident surface of the optical storage medium 21 to the information recording layer 21c, and that there is an interval d1 of 25 μm between the information recording layer 21b and the information recording layer 21c. Moreover, the tracks which are formed in the information recording layers 21b and 21c have a period tp (FIG. 27) of 0.32 μm. The opening of the objective lens 15 is restricted through the aperture 16, with a numerical aperture NA of 0.85. The transparent substrate 21a has a thickness of 0.1 mm, and a refractive index n of 1.62. The information recording layers 21b and 21c each have an equivalent reflectance of about 4 to 8%. Herein, an equivalent reflectance represents the light amount of a light beam which, after being reflected at the information recording layer 21b or 21c, again goes out from the optical storage medium 21, assuming that light beam entering the optical storage medium 21 has a light amount of 1. Although the information recording layer 21c absorbs or reflects most of the light amount of the incident light beam, the information recording layer 21b transmits about 50% of the light amount of the incident light beam, while absorbing or reflecting the other about 50% light amount, thus allowing the light beam to reach the information recording layer 21c.

The light beams 10a to 10c having been reflected from the information recording layer 21c are transmitted through the objective lens 15 and the ¼ wavelength plate 14 so as to be converted into linearly polarized light which has a 90° difference with respect to the forward path, and thereafter are reflected by the polarization beam splitter (splitting section) 63. The light beams 10a to 10c having been reflected by the polarization beam splitter 63 are converted into convergent light by the detection lens 64 having a focal length f3 of 50 mm, and enter the photodetector 30 via the cylindrical lens 65. When being transmitted through the cylindrical lens 65, astigmatism is imparted to the light beams 10a to 10c. When the light beams 10a to 10c come to a focal point on the information recording layer 21b or 21c, the light beam 10 on the photodetector 30 will be a circle of least confusion. Moreover, a driving current for the light source 1 is modulated by the high-frequency superposition element 66 with a high frequency having a frequency of 400 MHz, so that the light beam 10 emitted from the light source 1 has a plurality of wavelengths. Since the light beam 10 emitted from the light source 1 has a plurality of wavelengths, the lightness/darkness distribution due to interference is alleviated. The photodetector 30 outputs a signal which is in accordance with the light amount of each of the received light beams 10a to 10c.

Figure 3A:
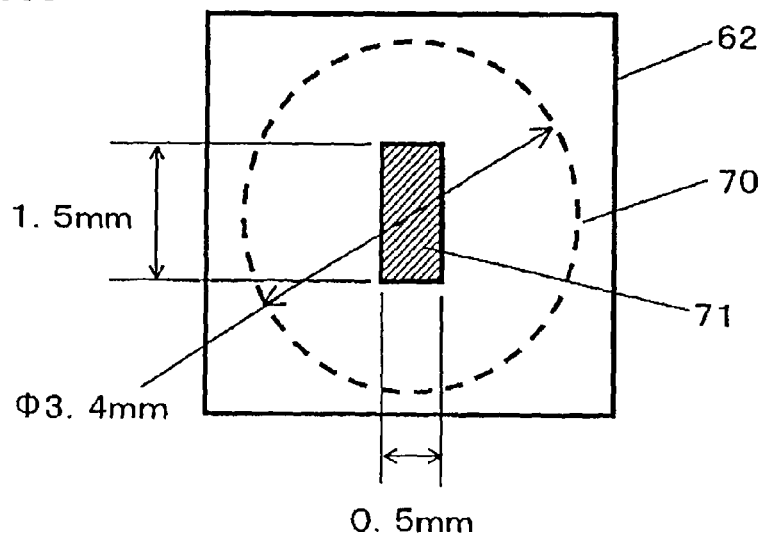
FIG. 3A A diagram showing a partial light shielding plate according to Embodiment 1 of the present invention.

FIG. 3A is a front view of the partial light shielding plate 62 for blocking a portion of the main light beam 10a. The partial light shielding plate 62 is provided in the optical path between the light source 1 and the objective lens 15. In the example shown in FIG. 2, it is provided between the diffraction section 61 and the polarization beam splitter 63. The light beam 10 having been emitted from the light source 1 is converted into a collimated light beam by the collimating lens 11, which is provided in the optical path between the light source 1 and the partial light shielding plate 62, and is split by the diffraction section 61. The partial light shielding plate 62 blocks a portion of the main light beam 10a, which is a collimated light beam. Blocking the collimated light beam facilitates alignment between the main light beam 10a and the partial light shielding plate 62.

With reference to FIG. 3A, a dotted line 70 shows a cross section of the main light beam 10a as projected onto the partial light shielding plate 62 when being transmitted through the aperture 16. A light shielding section 71 is located in the central portion of the partial light shielding plate 62, and blocks by absorbing a portion including the central portion of a cross section of a light beam wanting to pass through this portion, i.e., the main light beam 10a.

Figure 3B:
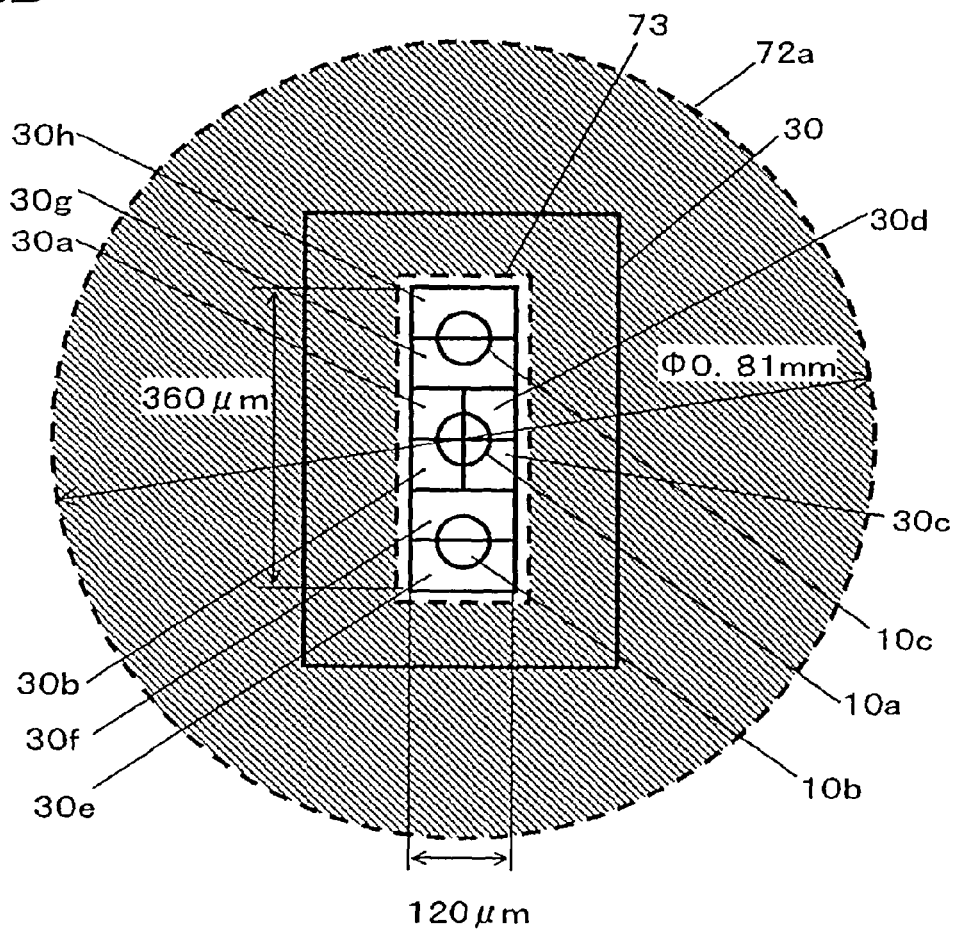
FIG. 3B A diagram showing a relationship between a photodetector and light beams according to Embodiment 1 of the present invention.

FIG. 3B is a diagram showing light beams 10a to 10c entering the photodetector 30 when the focal points of the light beams 10a to 10c are set to the desired information recording layer 21c. At this time, the main light beam 10a having been reflected at the information recording layer 21b enters the photodetector 30 as a light beam 72a. The sub-light beams 10b and 10c having been reflected at the information recording layer 21b also enter the photodetector 30, but are omitted from description for simplicity.

A light-shielded region 73 near the center of the light beam 72a is a portion which is shielded by the light shielding section 71 of the partial light shielding plate 62. The light-shielded region 73 is aligned to the photosensitive portions 30a to 30h of the photodetector 30. A portion of the light beam 72a entering the photosensitive portions 30a to 30h (i.e., light-shielded region 73) is blocked by the partial light shielding plate 62. By ensuring that the light beams 10b and 10c converged on the photosensitive portions 30e to 30h do not overlap the light beam 72a, interference can be prevented. As a result, the amplitude fluctuation of the TE signal can be reduced. By stably detecting the TE signal, information can be recorded and reproduced with a high reliability.

An exemplary design of the aforementioned partial light shielding plate 62 will be described. It is assumed that the detection lens 64 has a focal length f3=50 mm and the objective lens 15 has a focal length f2=2 mm, and that the detection system has a 25× magnification. It is assumed that the interval d1 between the information recording layer 21b and the information recording layer 21c is 20 μm at the minimum, and the information recording layer 21b and the transparent substrate 21a have a refractive index of 1.60. In this case, the light beam 72a having been reflected at the information recording layer 21b comes to a focal point about 1.5 mm behind the photodetector 30. Since the objective lens 15 has an NA of 0.85 and a focal length f2=2 mm, the light beam diameter is 3.4 mm. When a light beam with this diameter is converged at a position of (50+1.5) mm from the detection lens 64, the diameter is 0.81 mm on the photodetector 30 being placed at 50 mm from the detection lens 64. Therefore, the light beam 72a shown in FIG. 3B has a diameter of 0.81 mm. It is assumed that the region in which the photosensitive portions 30a to 30h are placed has a size of 120 μm×360 μm. In this case, a light-shielded region 73 of a size of about 120×360 μm or more needs to be formed with respect to a light beam having a diameter of 0.81 mm. Since the cross section (dotted line 70) of the light beam 10a when transmitted through the partial light shielding plate 62 has a diameter of 3.4 mm, the light shielding section 71 needs to have a size of about 1.5 mm×0.5 mm or more.

The photodetector 30 includes eight photosensitive portions 30a to 30h, such that the photosensitive portions 30a to 30d receive the main light beam 10a. The photosensitive portions 30e and 30f receive the sub-light beam 10b, whereas the photosensitive portions 30g and 30h receive the sub-light beam 10c. The photosensitive portions 30a to 30h output electrical signals I30a to I30h (not shown), respectively, which are in accordance with the received light amounts. An FE signal is obtained by using the signals I30a to I30d output from the photodetector 30. The detection method for the FE signal is an astigmatism technique, as obtained through the calculation of $(I30a+I30c)-(I30b+I30d)$, for example. The detection method for the TE signal is a DPP technique, as obtained through the calculation of $\{(I30a+I30d)-(I30b+I30c)\}-C\cdot\{(I30e+I30g)-(I30f+I30h)\}$, for example. Herein, C is a coefficient which is determined by a ratio of diffraction efficiencies, at the diffraction section 61, between the $0^{th}$ order diffracted light and either $1^{st}$ order diffracted light.

The FE signal and the TE signal are subjected to desired levels of amplification and phase compensation, and thereafter supplied to the actuators 31 and 32 for moving the objective lens 15, whereby focus control and tracking control are performed. Moreover, a reproduction signal (hereinafter referred to as RF signal) representing information which is recorded in the information recording layer 21c can be obtained through the calculation of $I30a+I30b+I30c+I30d$.

Moreover, in the case where the TE signal is detected by phase difference technique, the TE signal may be generated by comparing the signals I30a to I30d with respect to their output timing. Since the method for generating the TE signal by phase difference technique is often used when employing an optical storage medium having a read-only information recording layer and is generally well-known, the description thereof is omitted here.

Figure 4:
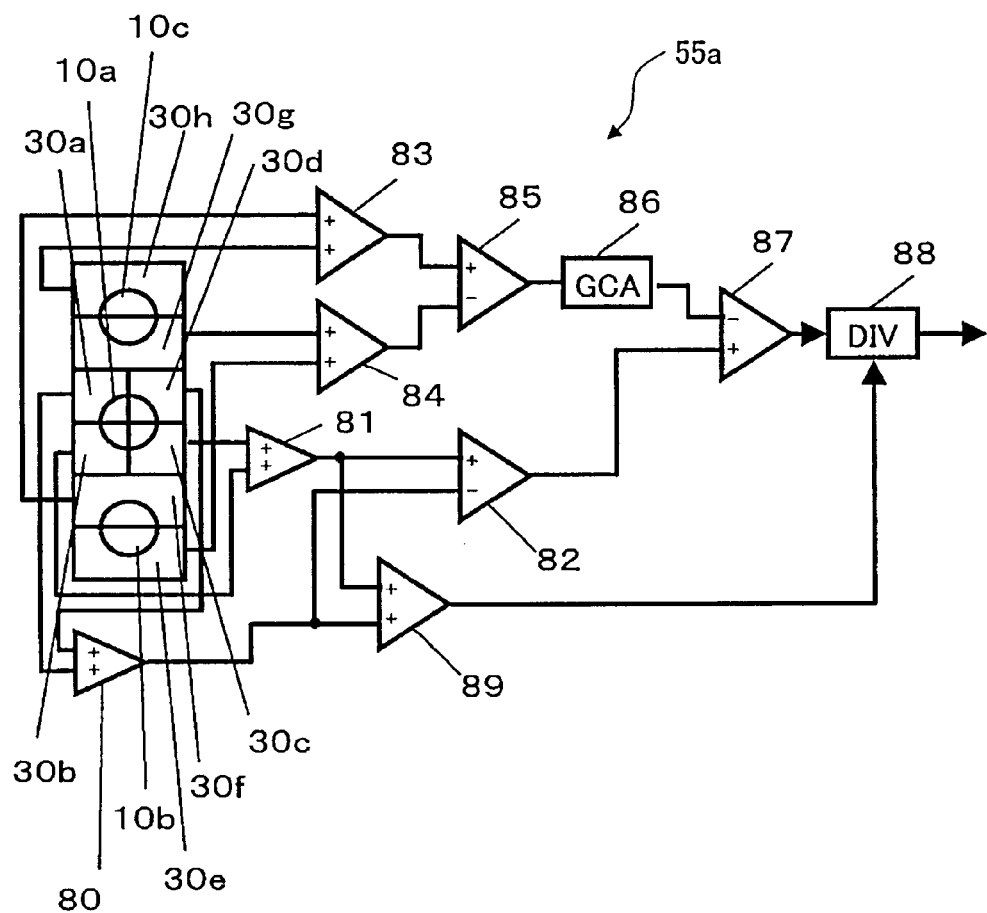
FIG. 4 A diagram showing a signal generation section according to Embodiment 1 of the present invention.

FIG. 4 is a diagram showing a signal generation section 55a for generating a TE signal. The signal generation section 55a can be provided in the second control section 55.

The signals I30a and I30d which are output from the photosensitive portions 30a and 30d are added by an addition section 80. The signals I30b and I30c which are output from the photosensitive portions 30b and 30c are added by an addition section 81. The signals which are output from the addition section 80 and the addition section 81 are input to a differential calculation section 82 so as to be subjected to a differential calculation. The signal obtained through the differential calculation, i.e., the signal $\{(I30a+I30d)-(I30b+I30c)\}$, is a TE signal which is detected by the so-called push-pull technique. In the case of detecting the TE signal by a simple push-pull technique, when the objective lens 15 is used for tracking in accordance with the eccentricity of the optical storage medium 21, fluctuations in offset will occur in the TE signal, which are responsive to the tracking. In the signal generation section 55a, the signals I30f and I30h which are output from the photosensitive portions 30f and 30h are added in an addition section 83, and the signals I30e and I30g which are output from the photosensitive portions 30e and 30g are added in an addition section 84. The signals which are output from the addition sections 83 and 84 are input to a differential calculation section 85 so as to be subjected to a differential calculation. The signal which is output from the differential calculation section 85 is input to a variable gain amplification section 86 so as to be subjected to an amplification or attenuation to a desired signal intensity. The degree of amplification at this time is C.

The signal that is output from the variable gain amplification section 86 has the same fluctuations as the offset fluctuations of the signal that is output from the differential calculation section 82, which are responsive to tracking. A differential calculation section 87 receive the signal that is output from the differential calculation section 82 and the signal that is output from the variable gain amplification section 86 and subject them to a differential calculation, thus subtracting the offset fluctuations which exist in the signal that is output from the differential calculation section 82, which are responsive to tracking. As a result, the signal that is output from the differential calculation section 87 becomes a TE signal which is almost free of offset fluctuations despite tracking. However, in this state, the signal intensity will change depending on changes in the reflectances of the information recording layers 21b and 21c and in the intensity of the light beam with which the optical storage medium 21 is irradiated. Therefore, the output signal from the differential calculation section 87 is input to a division section 88 so as to attain a constant amplitude. The signals I30a to I30d which are output from the photosensitive portions 30a to 30d are added in an addition section 89, and thereafter input to the division section 88 as a signal with which to perform a division. The signal that is output from the addition section 89 is a signal which is in proportion with the reflectances of the information recording layers 21b and 21c and the intensity of the light beam with which the optical storage medium 21 is irradiated. Therefore, the signal that is output from the division section 88 is a TE signal having a desired constant amplitude.

The optical storage medium 21 include the two information recording layers 21b and 21c. When performing recording/reproduction of information while setting the focal points of the light beams 10a to 10c to the information recording layer 21c, the light beams will also be reflected at the information recording layer 21b and thereafter enter the photodetector 30. The light beam 72a (FIG. 3B) is a light beam which enters the photodetector 30 as a result of the light beam 10a being reflected at the information recording layer 21b. Since the light beams 10a to 10c each come to a focal point at the information recording layer 21c, they are greatly defocused at the information recording layer 21b. Therefore, the light beam 72a is greatly defocused upon the photodetector 30. The photodetector 30 receives both the main light beam 10a and the sub-light beams 10b and 10c. Since the optical head device 50 includes the partial light shielding plate 62, the light beam 10b and the light beam 72a will not overlap, and the light beam 10c and the light beam 72a will not overlap. This eliminates the lightness/darkness distribution ascribable to interference which resides in the conventional optical head device.

Figure 5:
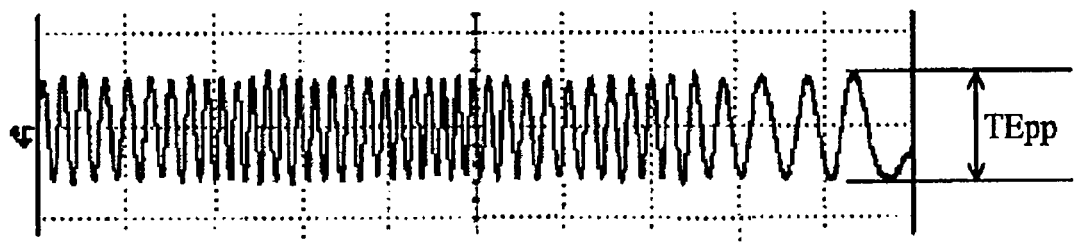
FIG. 5 A diagram showing behavior of a TE signal according to Embodiment 1 of the present invention.

FIG. 5 is a diagram showing an oscilloscope observation of a TE signal obtained with the optical information processing device 100 of the present embodiment. The TE signal is very stable in terms both of amplitude TEpp and symmetry. Thus, stable tracking control can be performed.

Moreover, in the optical head device 50, the partial light shielding plate 62 is placed in the forward path of the light beam 10*a*. Since the partial light shielding plate 62 blocks a portion of the light beam 10*a*, the energy of the light beam 10*a* is attenuated to a certain extent. Therefore, in view of energy attenuation, the light source 1 needs to emit a light beam 10 with a high energy in order to obtain a stable reproduction signal having a high S/N ratio. Now, a tentative case will be considered where the partial light shielding plate 62 is placed in the return path after the light beam 10*a* has been reflected from an information recording layer. In the case where the partial light shielding plate 62 is placed in the return path, in order to obtain a reproduction signal having the same S/N ratio as that in the case where the partial light shielding plate 62 is not placed in the return path, the information recording layer will need to be irradiated with a light beam having a higher energy than usual, thus possibly resulting in problems such as erasure of the information recorded in the information recording layer. However, in the optical head device 50 of the present embodiment, the partial light shielding plate 62 is placed in the forward path of the light beam 10*a*, so that the information recording layer is irradiated with the laser light 10*a* whose energy has been attenuated with the partial light shielding plate 62. Thus, the aforementioned problem does not occur.

Although an example has been illustrated where the light shielding section 71 of the partial light shielding plate 62 blocks a portion of the main light beam 10*a* by absorbing it, the light shielding section 71 may block a portion of the main light beam 10*a* by reflecting or diffracting it, in which case similar effects will also be obtained.

Embodiment 2

Next, with reference to FIG. 6A to FIG. 6B, a second embodiment of the optical head device according to the present invention will be described.

Figure 6A:
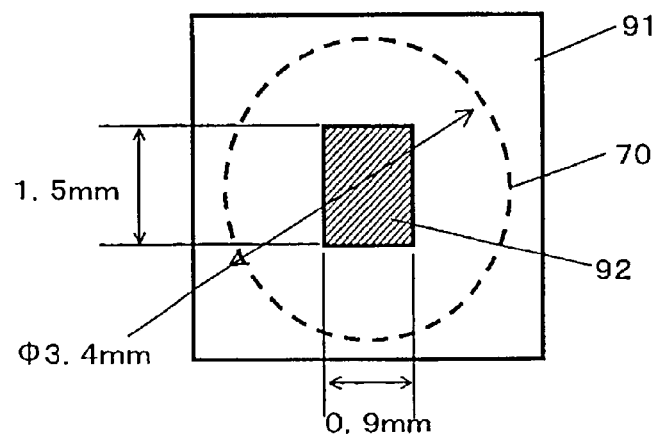
FIG. 6A A diagram showing a partial light shielding plate according to Embodiment 2 of the present invention.

FIG. 6A is a diagram showing a partial light shielding plate 91 according to the present embodiment. The partial light shielding plate 91 is to be mounted in the optical head device 50 instead of the partial light shielding plate 62 (FIG. 2). By using the partial light shielding plate 91, interference is prevented even when the position of the light-shielded region of the laser light is deviated.

The partial light shielding plate 91 differs from the partial light shielding plate 62 in that the width of the light shielding section 92 is expanded in the direction along which the objective lens 15 moves for tracking.

Figure 6B:
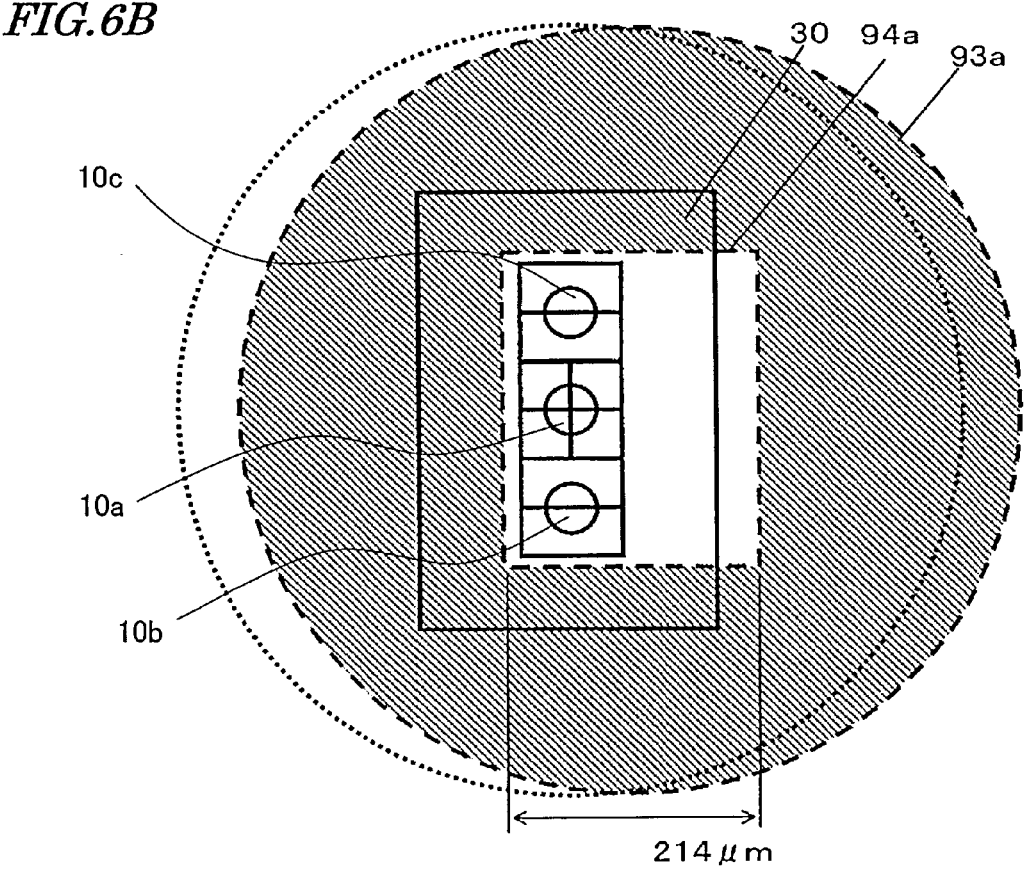
FIG. 6B A diagram showing a relationship between a photodetector and light beams according to Embodiment 2 of the present invention.

FIG. 6B is a diagram showing light beams 10*a* to 10*c* which enter the photodetector 30 when the focal points of the light beams 10*a* to 10*c* are set to the desired information recording layer 21*c*. At this time, the main light beam 10*a* having been reflected at the information recording layer 21*b* enters the photodetector 30 as a light beam 93*a*. The sub-light beams 10*b* and 10*c* having been reflected at the information recording layer 21*b* also enter the photodetector 30, but are omitted from description for simplicity.

A light-shielded region 94*a* near the center of the light beam 93*a* is a portion which is shielded by the light shielding section 92 of the partial light shielding plate 91. Since the width of the light shielding section 92 is expanded as mentioned above, the photosensitive portions 30*a* to 30*h* will fit within the light-shielded region 94*a* even when the position of the objective lens 15 is deviated due to tracking. Since the light beam 93*a* will not overlap the light beams 10*b* and 10*c* even when the position of the objective lens 15 is deviated due to tracking, interference can be prevented.

An exemplary design of the aforementioned partial light shielding plate 91 will be described. It is assumed that the conditions of the optical system are the same as in the example which has been illustrated in the description of Embodiment 1. It is designed so that the light beam 93*a* will not overlap the light beams 10*b* and 10*c* even when the objective lens moves by 100 μm due to tracking. When the objective lens moves by 100 μm, the light-shielded region 94*a*, which is a shadow of the light shielding section 92 on the photodetector 30, moves twice that distance. Therefore, in order to cover the range of ±100 μm, the width of the light shielding section 92 needs to be increased by 400 μm. Accordingly, the lateral width of the light shielding section 92 is made 0.9 mm. The width along the vertical direction may be the same as the length that has been illustrated in the description of Embodiment 1, i.e., 1.5 mm.

By employing the partial light shielding plate 91, the light beam 93*a* will not overlap the light beams 10*b* and 10*c* even when the objective lens 15 moves due to tracking or the like, so that interference will not occur. This allows for an increased moving range of the objective lens 15 in which the tracking signal is stably obtained.

Although a design has been herein illustrated where the amount of move of the objective lens 15 is ±100 μm, the present invention is not limited thereto. Similar effects can also be obtained if the width of the light shielding section 92 is increased or decreased in accordance with the design.

Embodiment 3

Next, with reference to FIG. 7A to FIG. 7B, a third embodiment of the optical head device according to the present invention will be described.

Figure 7A:
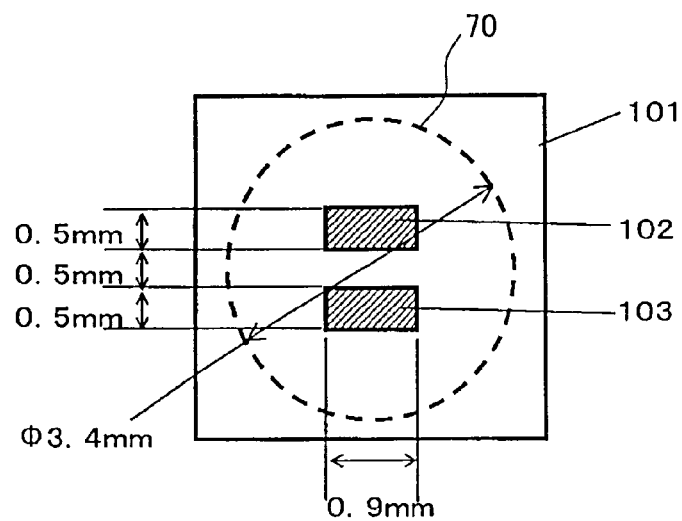
FIG. 7A A diagram showing a partial light shielding plate according to Embodiment 3 of the present invention.

FIG. 7A is a diagram showing a partial light shielding plate 101 according to the present embodiment. The partial light shielding plate 101 is to be mounted in the optical head device 50 instead of the partial light shielding plate 62 (FIG. 2).

The partial light shielding plate 101 differs from the partial light shielding plate 62 in that two light shielding sections 102 and 103 are provided at positions corresponding to the photosensitive portions for receiving the sub-light beams 10*b* and 10*c*. Moreover, as in the light shielding section 92 (FIG. 6A), the width of the light shielding sections 102 and 103 is increased in the direction along which the objective lens 15 moves for tracking.

With reference to FIG. 7A, the dotted line 70 shows a cross section of the main light beam 10*a* as projected onto the partial light shielding plate 62 when being transmitted through the aperture 16. Light shielding sections 102 and 103 block two portions which are in symmetric positions with respect to the central portion of the cross section of the main light beam 10*a*. The photosensitive portions 30*e* to 30*f* and the photosensitive portions 30*g* to 30*h* are symmetrically located with respect to the photosensitive portions 30*a* to 30*d*.

Figure 7B:
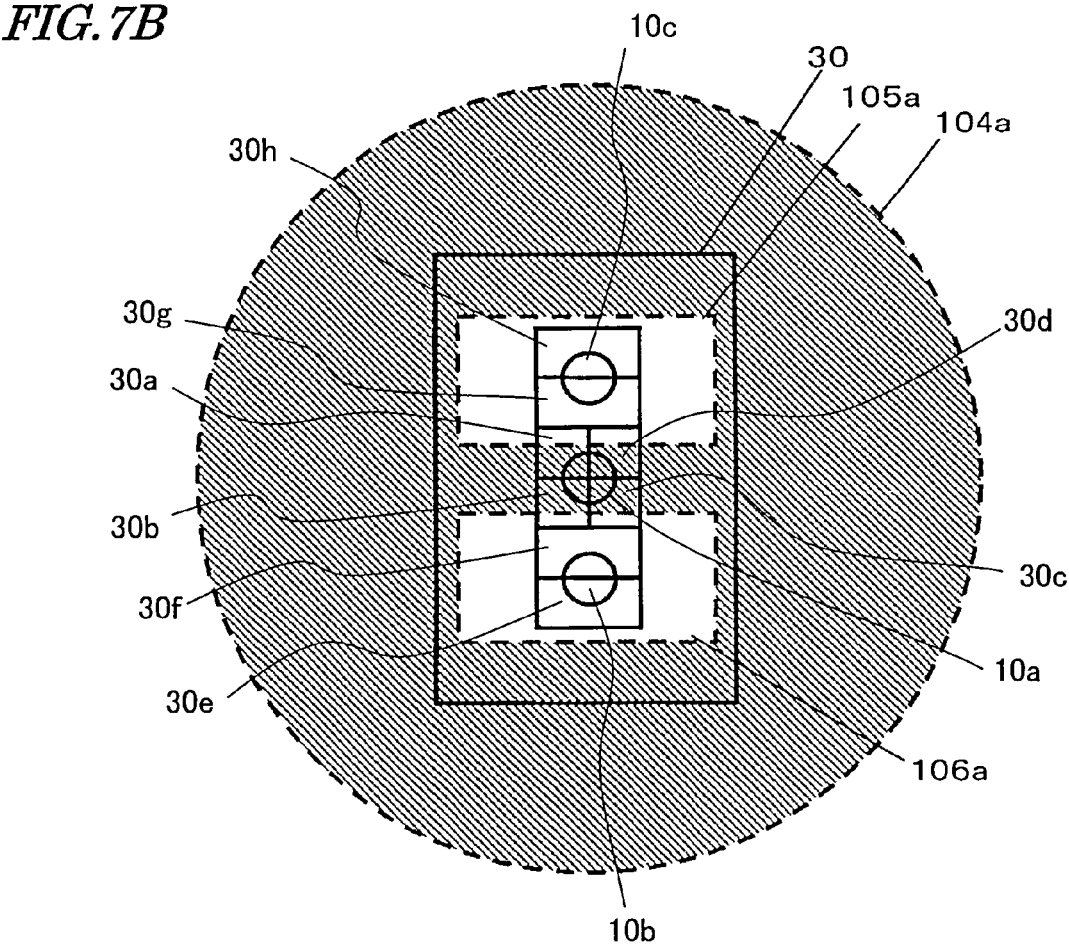
FIG. 7B A diagram showing a relationship between a photodetector and light beams according to Embodiment 3 of the present invention.

FIG. 7B is a diagram showing the light beams 10*a* to 10*c* entering the photodetector 30 when the focal points of the light beams 10*a* to 10*c* are set to the desired information recording layer 21*c*. At this time, the main light beam 10*a* having been reflected at the information recording layer 21*b* enters the photodetector 30 as a light beam 104*a*. The sub-light beams 10*b* and 10*c* having been reflected at the information recording layer 21*b* also enter the photodetector 30, but are omitted from description for simplicity.

Light-shielded regions 105*a* and 106*a* included in the light beam 104*a* are portions shielded by the light shielding sections 102 and 103. The light-shielded regions 105*a* and 106*a* are aligned to the photosensitive portions 30*e* to 30*h*. Portions of the light beam 104a entering the photosensitive portions 30e to 30h (i.e., the light-shielded regions 105a and 106a) are blocked by the light shielding sections 102 and 103. By ensuring that the light beams 10b and 10c converged on the photosensitive portions 30e to 30h do not overlap the light beam 104a, interference can be prevented. As a result, the amplitude fluctuation of the TE signal can be reduced. By stably detecting the TE signal, information can be recorded and reproduced with a high reliability.

An exemplary design of the aforementioned partial light shielding plate 101 will be described. It is assumed that the conditions of the optical system are the same as in the example which has been illustrated in the description of Embodiment 1. It is designed so that the light beam 104a will not overlap the light beams 10b and 10c even when the objective lens moves by 100 μm due to tracking. The photosensitive portions 10e to 10h for receiving the sub-light beams 10b and 10c are located ⅓ of the way from either end of the photosensitive portions 10a to 10h. Therefore, assuming that the light shielding section 102 has a vertical width of 0.5 mm and the light shielding section 103 has a vertical width of 0.5 mm, these two light shielding sections are disposed with an interval of 0.5 mm therebetween. The width of the light shielding sections 102 and 103 along the horizontal direction may be 0.9 mm, as has been shown in the description of Embodiment 2.

Since the total area of the light shielding section can be reduced by using the partial light shielding plate 101, the influence on the reproduction signal that is exerted by the light amount attenuation due to light shielding can be reduced.

Embodiment 4

Next, with reference to FIG. 8 to FIG. 9, a fourth embodiment of the optical head device according to the present invention will be described.

Figure 8:
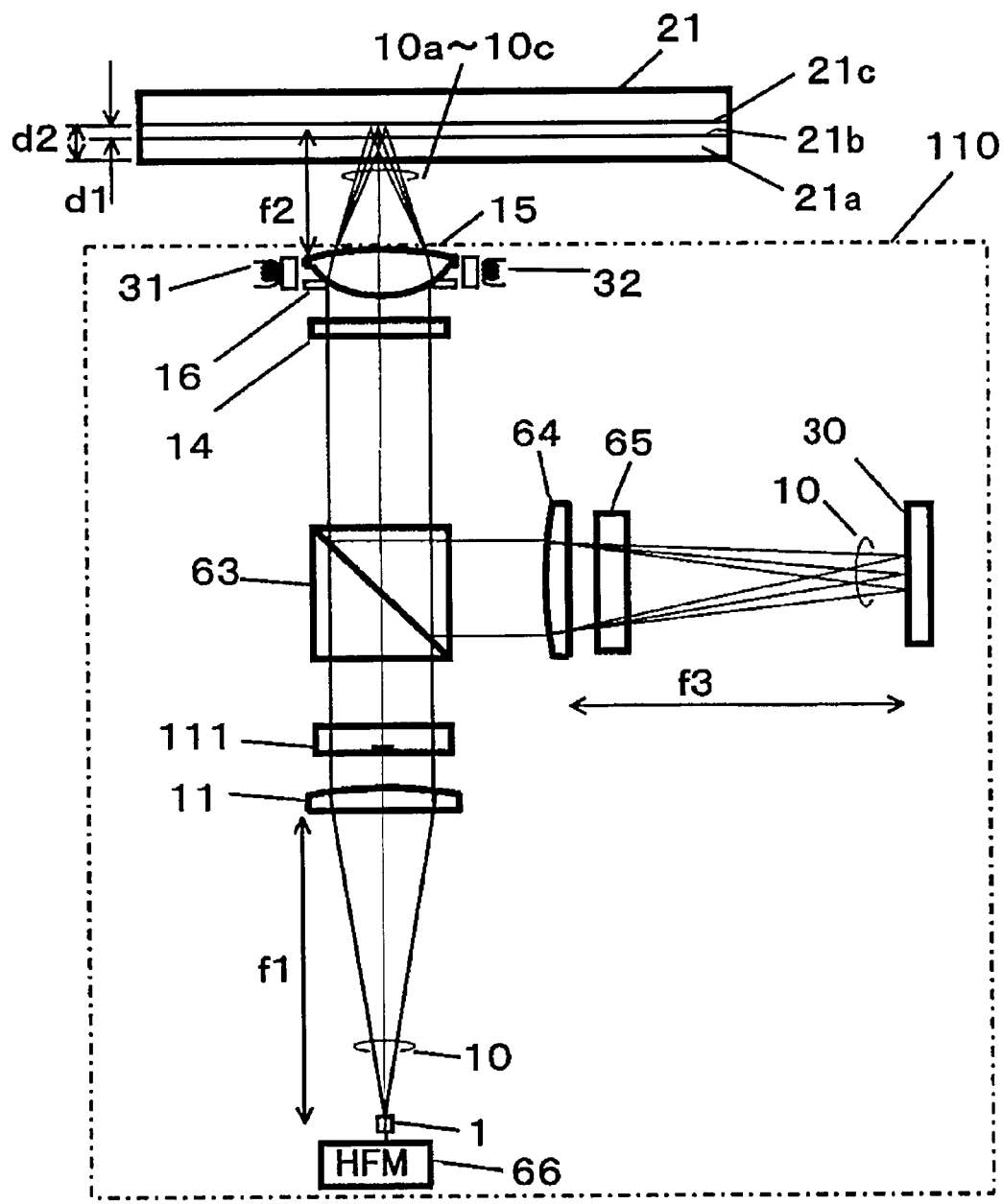
FIG. 8 A diagram showing an optical head device according to Embodiment 4 of the present invention.

FIG. 8 is a diagram showing an optical head device 110 according to the present embodiment. The optical head device 110 is to be mounted in the optical information processing device 100 instead of the optical head device 50 (FIG. 2). The optical head device 110 includes a diffraction section 111 instead of the diffraction section 61 and the partial light shielding plate 62, while the other constituent elements are identical to those of the optical head device 50.

The diffraction section 111 includes regions with a locally high diffraction efficiency, thus having the function of a partial light shielding section. The diffraction section 111 diffracts the incident light beam 10 to generate the light beams 10a, 10b and 10c. The partial regions having a high diffraction efficiency diffract all of the incident light beam 10 into the sub-light beams 10b and 10c, thus providing a function which is similar to that of the partial light shielding section for the main light beam 10a.

Figure 9:
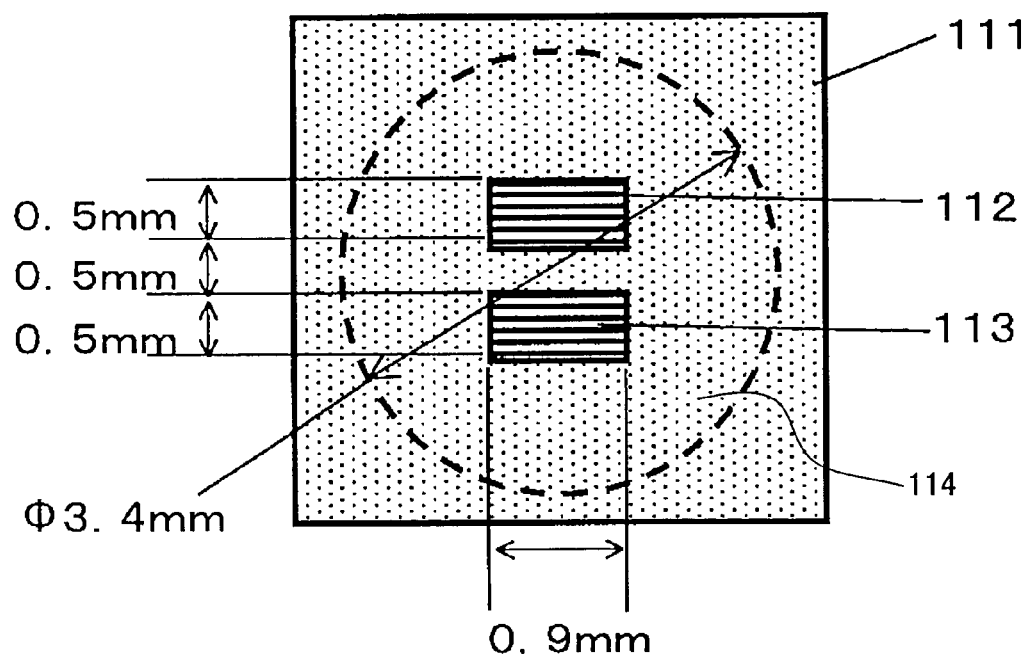
FIG. 9 A diagram showing a diffraction grating according to Embodiment 4 of the present invention.

FIG. 9 is a diagram showing the diffraction section 111. The diffraction section 111 includes: a first partial diffraction section 114 which generates more of the main light beam 10a than the sub-light beams 10b and 10c; and second partial diffraction sections 112 and 113 which generate more of the sub-light beams 10b and 10c than the main light beam 10a. The second partial diffraction sections 112 and 113 are high-diffraction efficiency sections having a high diffraction efficiency.

The high-diffraction efficiency sections 112 and 113 have diffraction gratings with deeper grooves than does the other region (first partial diffraction section 114), such that the ratio of diffraction efficiencies between the $0^{th}$ order diffracted light 10a and either $1^{st}$ order diffracted light 10b or 10c is 0:1. Similarly to Embodiment 1, the first partial diffraction section 114 has a ratio of diffraction efficiencies of 20:1.

The positioning of the pair of high-diffraction efficiency sections 112 and 113 within the diffraction section 111 and their relative positioning with respect to the light beam 10 are similar to the positioning of the pair of light shielding sections 102 and 103 (FIG. 7A) and their relative positioning with respect to the main light beam 10a. The pair of high-diffraction efficiency sections 112 and 113 are in symmetric positions with respect to the central portion of the cross section of the light beam 10 entering the diffraction section 111.

The high-diffraction efficiency sections 112 and 113 are sized to result in the same design as that of the light shielding sections 102 and 103, with a lateral width of 0.9 mm, a vertical width of 0.5 mm, and an interval of 0.5 mm. With such positioning, it is possible to form light-shielded regions which are similar to the light-shielded regions 105a and 106a (FIG. 7B), so that interference does not occur on the photosensitive portions 30a to 30h of the photodetector 30. As a result, the amplitude fluctuation of the TE signal can be reduced, and information can be recorded and reproduced with a high reliability.

Using the diffraction section 111 makes it possible to integrate the light shielding section and the diffraction section, so that the optical head 110 can be made small and the number of steps during manufacture can be reduced.

Embodiment 5

Next, with reference to FIG. 10A to FIG. 10B, a fifth embodiment of the optical head device according to the present invention will be described.

Figure 10A:
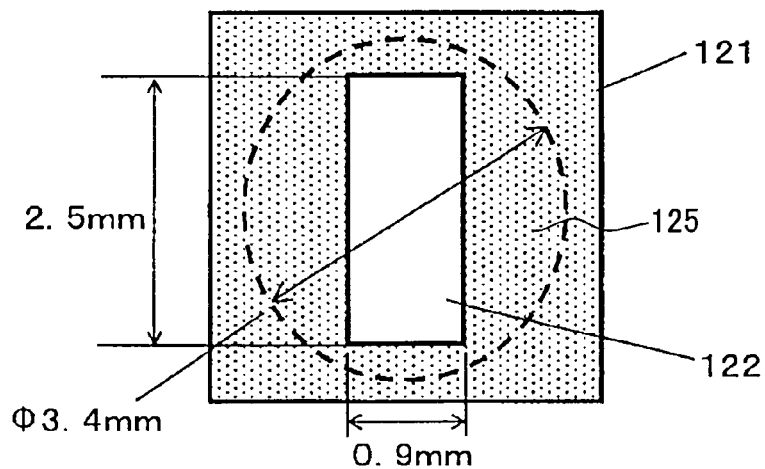
FIG. 10A A diagram showing a diffraction grating according to Embodiment 5 of the present invention.

FIG. 10A is a diagram showing a diffraction section 121 according to the present embodiment. The diffraction section 121 is to be mounted in the optical head device 110 instead of the diffraction section 111 (FIG. 8). The diffraction section 121 prevents interference associated with the sub-light beams 10b and 10c having been reflected at any information recording layer other than a desired information recording layer.

FIG. 10A is a front view of the diffraction section 121. The diffraction section 121 is to be used instead of the diffraction section 111 (FIG. 8), but may also be used instead of the diffraction section 61 (FIG. 2).

In the first partial diffraction section 125 of the diffraction section 121, the ratio of diffraction efficiencies between the main light beam 10a and either sub-light beam 10b or 10c is the same as that in the diffraction section 61 (FIG. 2), e.g., 20:1.

The diffraction section 121 includes a second partial diffraction section (low-diffraction efficiency section) 122 which generates the main light beam with a higher rate than does the first partial diffraction section 125. For example, no diffraction grating grooves are formed in the low-diffraction efficiency section 122, and the ratio of diffraction efficiencies in this case is about 1:0. The low-diffraction efficiency section 122 is placed in a position where the central portion of the cross section of the light beam 10 entering the diffraction section 121 passes through. The laser light 10 entering the low-diffraction efficiency section 122 is entirely output as the main light beam 10a, i.e., $0^{th}$ order light, without being diffracted.

Figure 10B:
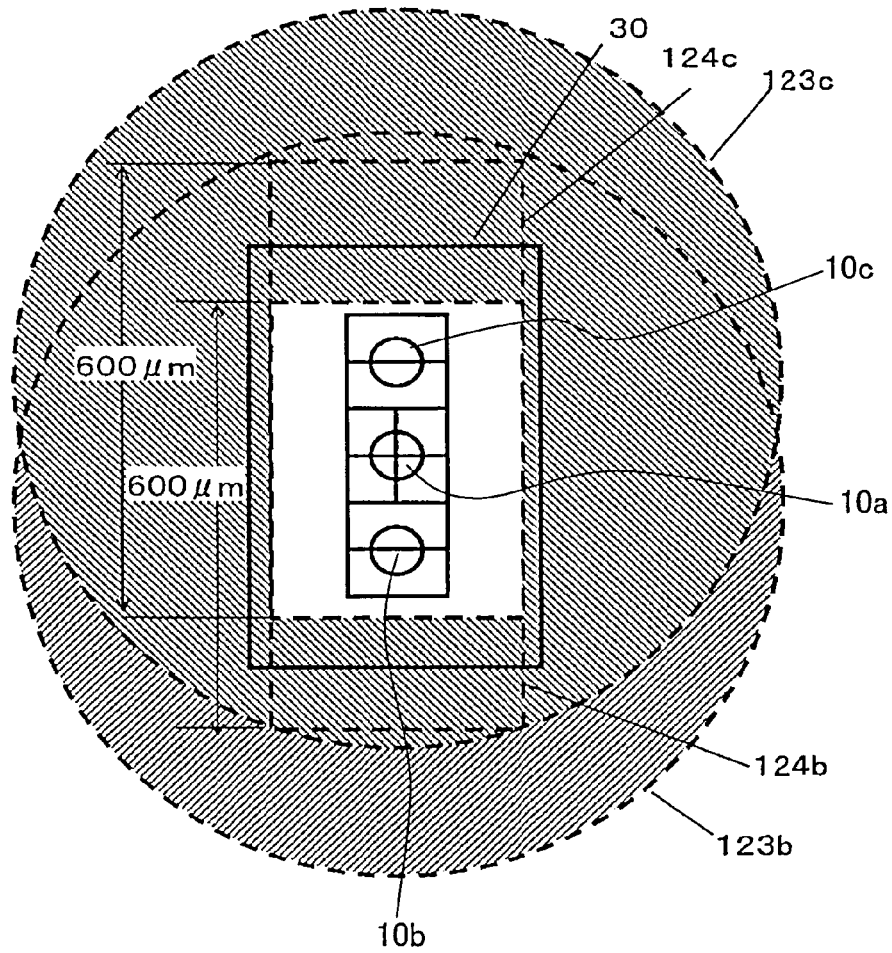
FIG. 10B A diagram showing a relationship between a photodetector and light beams according to Embodiment 5 of the present invention.

FIG. 10B is a diagram showing the light beams 10a to 10c entering the photodetector 30 when the focal points of the light beams 10a to 10c are set to the desired information recording layer 21c. At this time, the sub-light beams 10b and 10c having been reflected at the information recording layer 21b enter the photodetector 30 as light beams 123b and 123c. The main light beam 10a having been reflected at the information recording layer 21b also enters the photodetector 30, but is omitted from description for simplicity.

In a light-shielded region 124b near the center of the light beam 123b, light is shielded because there are no diffraction grating grooves in the low-diffraction efficiency section 122. Also in a light-shielded region 124c near the center of the light beam 123c, light is shielded because there are no diffraction grating grooves in the low-diffraction efficiency section 122. The incident positions of the light-shielded regions 124b and 124c are based on the sub-light beams 10b and 10c, and therefore are shifted along the up-down direction in FIG. 10B. For this reason, the low-diffraction efficiency section 122 is designed so that the photosensitive portions 10a to 10h fit within a region where the light-shielded regions 124b and 124c overlap (shown white in FIG. 10B). Even when the position of the objective lens 15 is deviated due to tracking, the light-shielded regions 124b and 124c will be in positions from the photosensitive portions 30a to 30h. Therefore, the light beams 123b and 123c will not overlap the light beams 10a to 10c, so that no interference will occur. As a result, the amplitude fluctuation of the TE signal can be reduced. By stably detecting the TE signal, information can be recorded and reproduced with a high reliability.

An exemplary design of the aforementioned low-diffraction efficiency section 122 will be described. It is assumed that the conditions of the optical system are the same as in the example which has been illustrated in the description of Embodiment 1. Relative to the main light beam having been reflected at the information recording layer 21b and entering the photodetector 30, the positions of the light beams 123b and 123c on the photodetector 30 are shifted by 120 µm. Therefore, the light-shielded regions 124b and 124c each need a length of 360+120×2=600 µm along the vertical direction. This will translate into about 2.5 mm upon the diffraction section 121. The horizontal dimension is 0.9 mm in case the objective lens 15 moves by 100 µm due to tracking.

By using the low-diffraction efficiency section 122, interference associated with the sub-light beams 10b and 10c having been reflected at any information recording layer other than the desired information recording layer can be prevented. The low-diffraction efficiency section 122 may be combined with the optical head devices of Embodiments 1 to 3, whereby fluctuation in the TE signal due to interference can be more fully suppressed.

Note that shallow grooves may be formed as a diffraction grating in the low-diffraction efficiency section 122. It suffices so long as the low-diffraction efficiency section 122 has a lower diffraction efficiency than that of the first partial diffraction section 125.

Embodiment 6

Next, with reference to FIG. 11 to FIG. 12, a sixth embodiment of the optical head device according to the present invention will be described.

Figure 11:
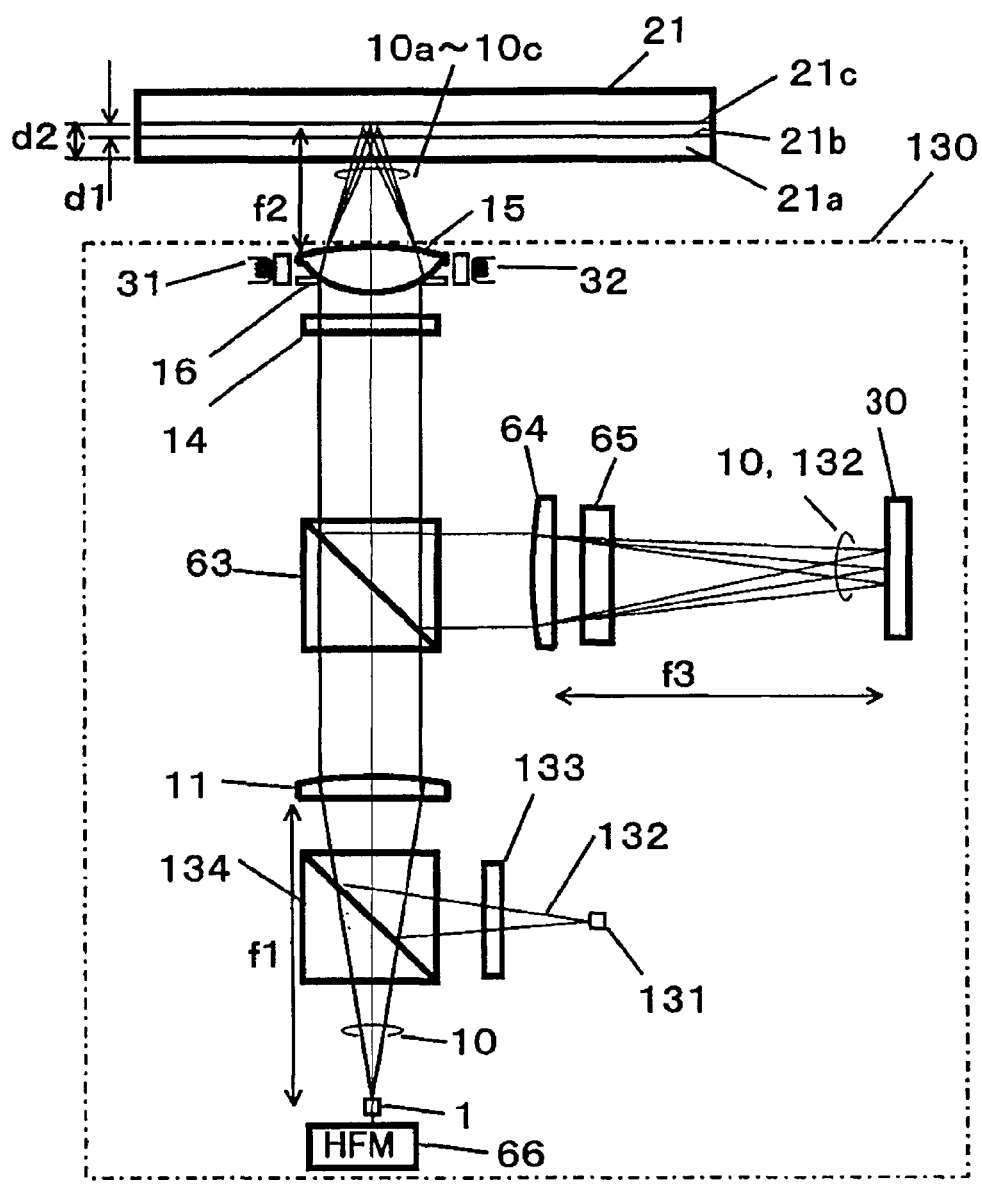
FIG. 11 A diagram showing an optical head device according to Embodiment 6 of the present invention.

FIG. 11 is a diagram showing an optical head device 130 according to the present embodiment. In the optical head device 130, the main light beam and the sub-light beams are generated from separate light sources. The optical head device 130 is to be mounted in the optical information processing device 100 instead of the optical head device 50 (FIG. 2). Instead of the diffraction section 61 and the partial light shielding plate 62, the optical head device 130 includes a light source 131, a diffraction section 133, and a beam splitter 134. The other constituent elements are identical to those of the optical head device 50.

The light source 1 emits a light beam 10 as a main light beam. The light source 131 emits a light beam 132 as a sub-light beam. The light beam 10 and the light beam 132 have different wavelengths.

The light beam 132 which is emitted from the light source 131 is diffracted by the diffraction section 133, whereby two sub-light beams 132b and 132c are output. The light beam 10 and the two sub-light beams are oriented in substantially the same direction by the beam splitter 134, pass through the collimator lens 11 and the beam splitter 63, so as to be converged onto the optical storage medium 21 by the objective lens 15. At this time, the sub-light beams 132b and 132c are converged at the same positions as the sub-light beams 10b and 10c shown in FIG. 27. The three light beams having been reflected and diffracted by the optical storage medium 21 again pass through the objective lens 15, and are reflected by the beam splitter 63, converged by the detection lens 64 so as to pass through the cylindrical lens 65, and enter the photodetector 30.

Figure 12:
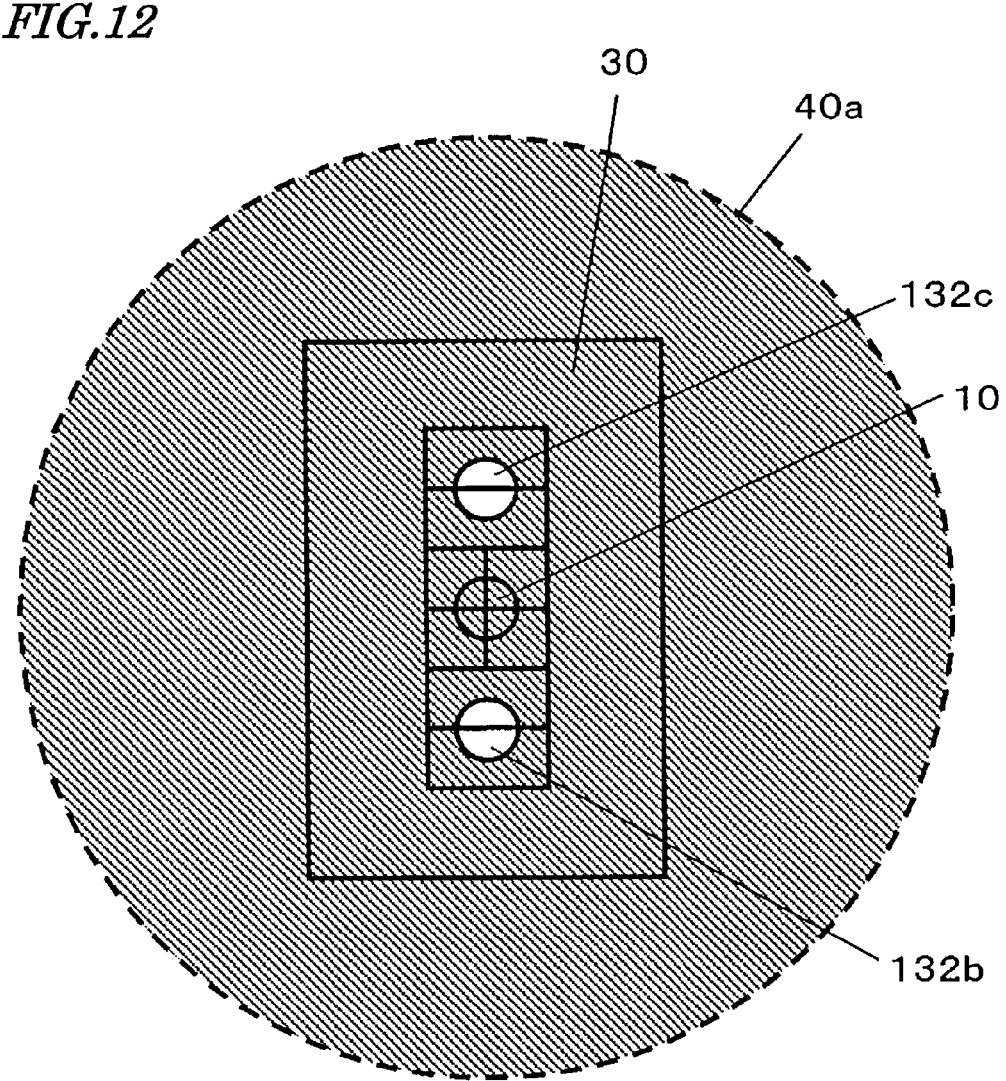
FIG. 12 A diagram showing a relationship between a photodetector and light beams according to Embodiment 6 of the present invention.

FIG. 12 is a diagram showing the light beams 10, 132b and 132c entering the photodetector 30 when the focal points of the light beams 10, 132b and 132c are set to the desired information recording layer 21c. At this time, the main light beam 10 having been reflected at the information recording layer 21b enters the photodetector 30 as a light beam 40a. The sub-light beams 132b and 132c having been reflected at the information recording layer 21b also enter the photodetector 30, but are omitted from description for simplicity. Although the light beam 40a and the light beams 132b and 132c overlap, they are of different wavelengths, so that no interference occurs. As a result, the amplitude fluctuation of the TE signal can be reduced. By stably detecting the TE signal, information can be recorded and reproduced with a high reliability.

In the optical head device 130, it is unnecessary to provide a light shielding section or the like in the forward path of light. Therefore, interference can be prevented without affecting signal reproduction, and a TE signal can be stably obtained.

Embodiment 7

Figure 13:
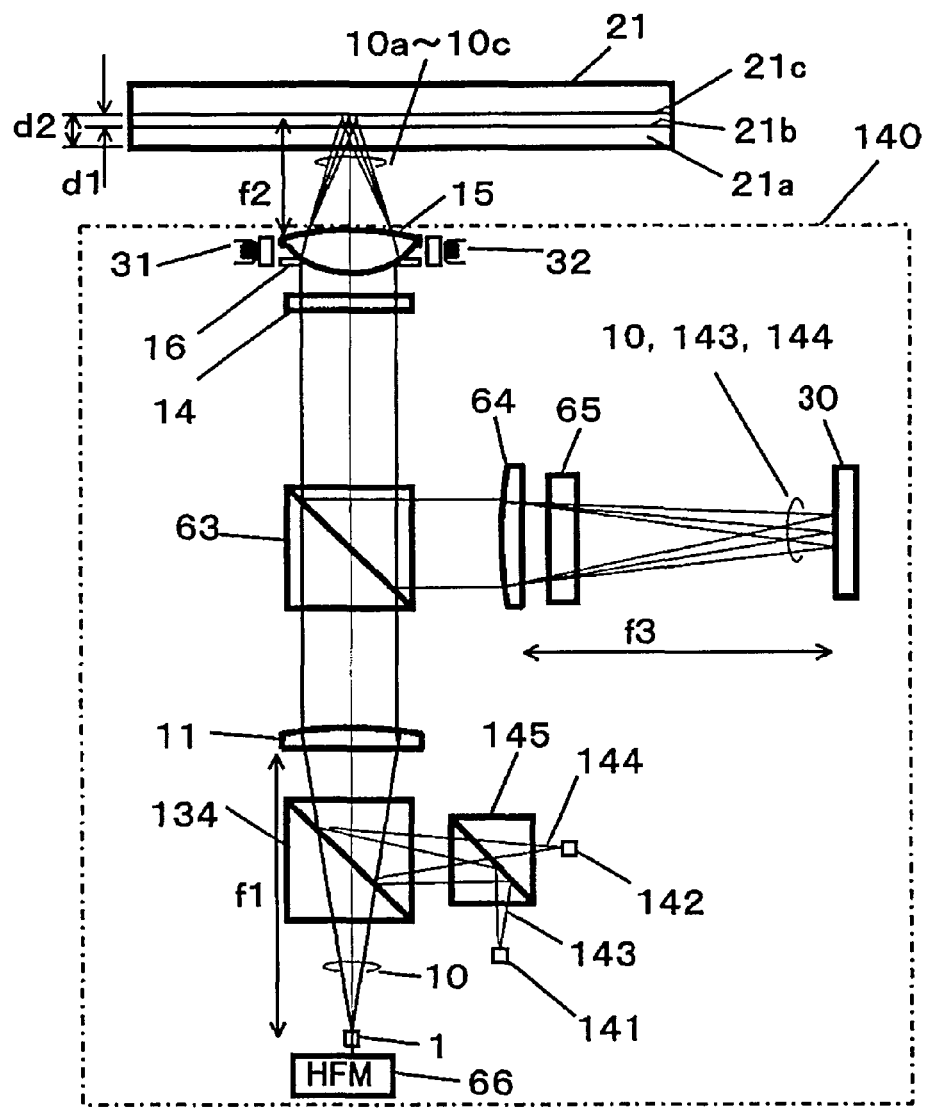
FIG. 13 A diagram showing an optical head device according to Embodiment 7 of the present invention.

Next, with reference to FIG. 13, a seventh embodiment of the optical head device according to the present invention will be described.

FIG. 11 is a diagram showing an optical head device 140 according to the present embodiment. In the optical head device 140, the main light beam and the sub-light beams are generated from separate light sources. The optical head device 140 is to be mounted in the optical information processing device 100 instead of the optical head device 50 (FIG. 2). In comparison with the optical head device 130, the optical head device 140 includes light sources 141 and 142 and a beam splitter 145 instead of the light source 131 and the diffraction section 133. The other constituent elements are identical to those of the optical head device 130.

The light source 1 emits a light beam 10 as the main light beam. The light sources 141 and 142 emit light beams 143 and 144 as the sub-light beams. The light beam 10, the light beam 143, and the light beam 144 have different wavelengths.

The light beams 143 and 144 which are emitted from the light sources 141 and 142 are oriented in one direction by the beam splitter 145. Furthermore, the light beam 10 and the light beam 143 and light beam 144 are oriented in substantially the same direction by the beam splitter 134. The ensuing operation of the optical head device 140 is similar to that of the optical head device 130.

The light beam 10, the light beam 143, and the light beam 144 are of different wavelengths, and therefore no interference occurs on the photodetector 30. As a result, the amplitude fluctuation of the TE signal can be reduced. By stably detecting the TE signal, information can be recorded and reproduced with a high reliability.

In the optical head device 140, it is unnecessary to provide a light shielding section or the like in the forward path of light. Therefore, interference can be prevented without affecting signal reproduction, and a TE signal can be stably obtained.

Embodiment 8

Next, with reference to FIG. 14, FIG. 15A, and FIG. 15B, an eighth embodiment of the optical head device according to the present invention will be described.

Figure 14:
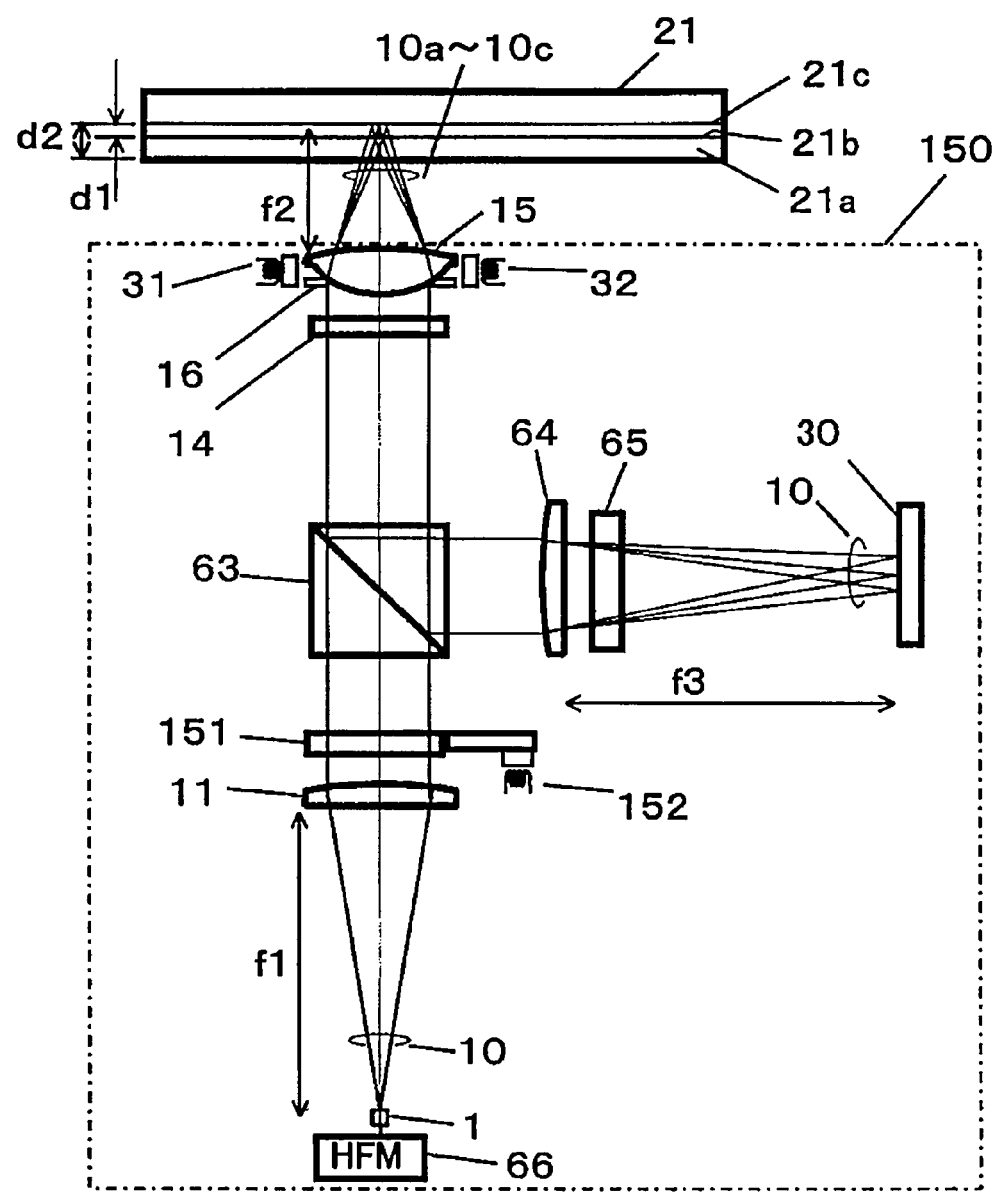
FIG. 14 A diagram showing an optical head device according to Embodiment 8 of the present invention.

FIG. 14 is a diagram showing an optical head device 150 according to the present embodiment. The optical head device 150 is to be mounted in the optical information processing device 100 instead of the optical head device 50 (FIG. 2). The optical head device 150 includes a diffraction section 151 and an actuator 152 instead of the diffraction section 61 and the partial light shielding plate 62, while the other constituent elements are identical to those of the optical head device 50. The actuator 152 functions as a swing section for causing the diffraction section 151 to swing in a direction which is perpendicular to the direction along which the grooves of the diffraction grating of the diffraction section 151 extend. By swinging the diffraction section 151, the interference fringes are averaged out over time.

Figure 15A:
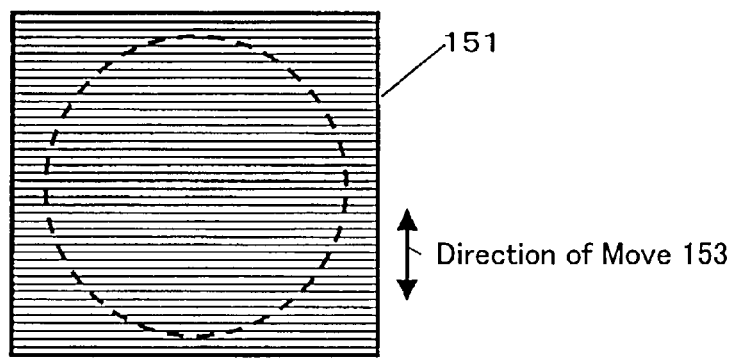
FIG. 15A A diagram showing a diffraction grating according to Embodiment 8 of the present invention.
Figure 15B:
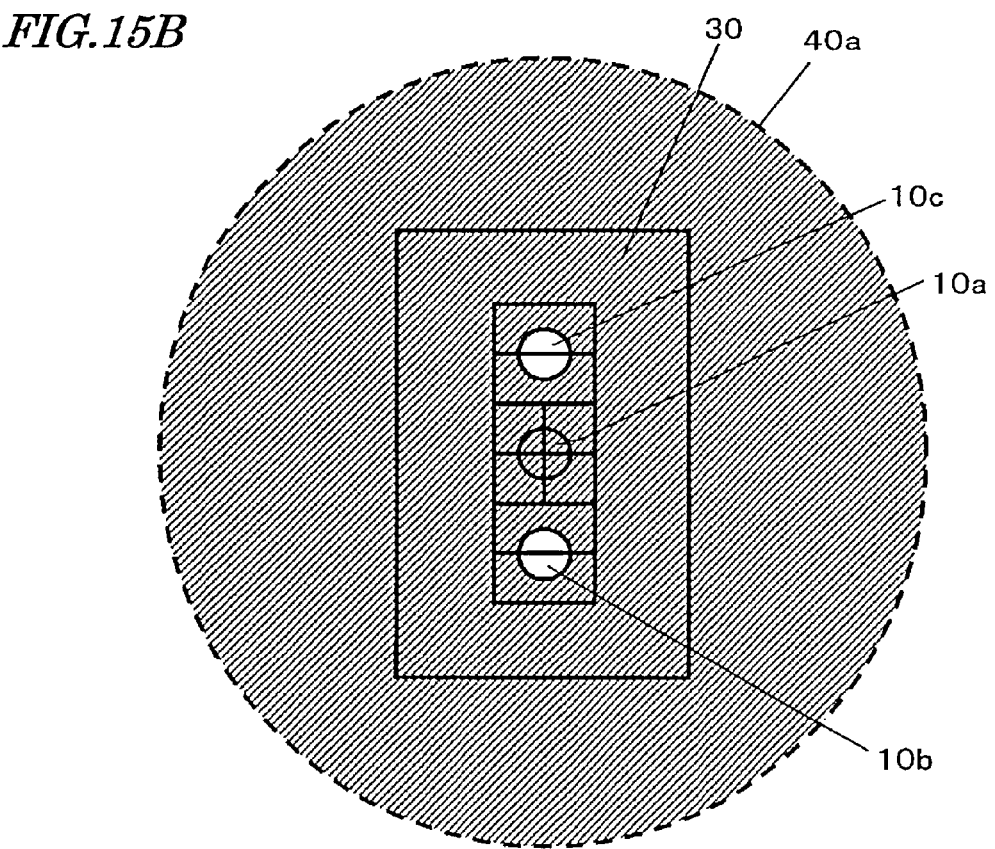
FIG. 15B A diagram showing a relationship between a photodetector and light beams according to Embodiment 8 of the present invention.

FIG. 15A is a front view of the diffraction section 151, and shows a direction of move of the diffraction section 151. The grooves of the diffraction grating are formed along the horizontal direction, whereas diffracted light occurs along the vertical direction. The direction of move 153 is the same direction (vertical direction) as the direction along which diffracted light occurs.

FIG. 12 is a diagram showing the light beams 10a to 10c entering the photodetector 30 when the focal points of the light beams 10a to 10c are set to the desired information recording layer 21c. At this time, the main light beam 10 having been reflected at the information recording layer 21b enters the photodetector 30 as a light beam 40a. The sub-light beams 10b and 10c having been reflected at the information recording layer 21b also enter the photodetector 30, but are omitted from description for simplicity. Although the light beam 40a overlaps the light beams 10b and 10c, the light beams 10b and 10c change in phase as the diffraction grating moves, so that the interference fringes move with time. As a result, the fluctuations in the signal due to interference fringes are averaged out.

An exemplary design of the aforementioned diffraction section 151 and actuator 152 will be described. It is assumed that the conditions of the optical system are the same as in the example which has been illustrated in the description of Embodiment 1. Assuming that there is an interval of 5 µm between the main light beam and the sub-light beams upon the optical storage medium 21, and that the light beam 10 has a wavelength of 405 nm, the diffraction grating of the diffraction section 151 has a pitch of 162 µm. Assuming that the gain crossover for tracking servo is kHz, and the TE signal needs to be averaged at 5 kHz, it is necessary to move 81 µm in 0.2 msec to ensure that interference fringes will be inverted in lightness/darkness. In other words, the diffraction section 151 may be swung with an average speed of 0.4 m/sec.

In the optical head device 150, it is unnecessary to provide a light shielding section or the like in the forward path of light. Therefore, interference can be prevented without affecting signal reproduction, and a TE signal can be stably obtained.

Embodiment 9

Figure 16:
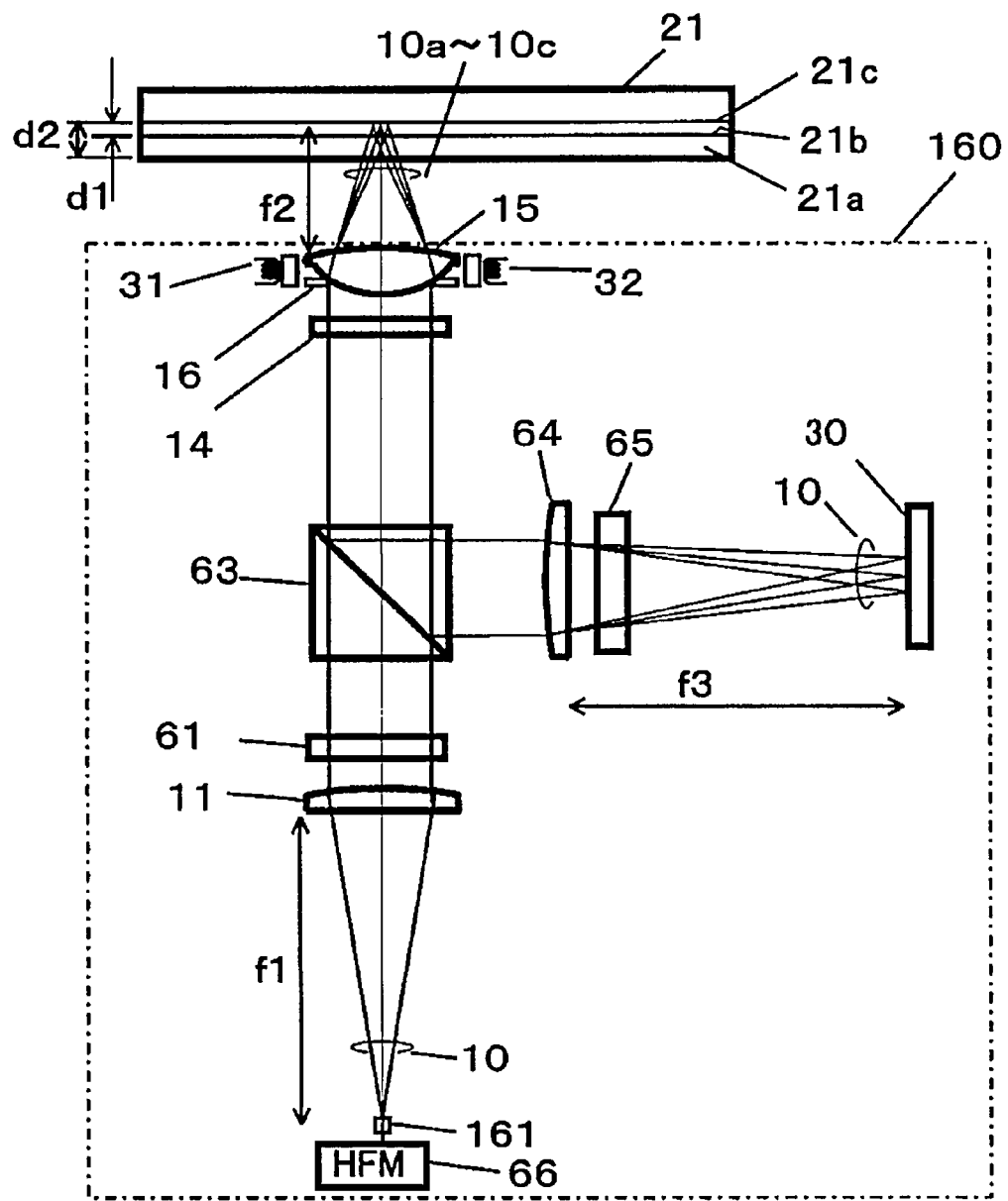
FIG. 16 A diagram showing an optical head device according to Embodiment 9 of the present invention.

Next, with reference to FIG. 16, a ninth embodiment of the optical head device according to the present invention will be described. FIG. 16 is a diagram showing an optical head device 160 according to the present embodiment. The optical head device 160 is to be mounted in the optical information processing device 100 instead of the optical head device 50 (FIG. 2). The optical head device 160 includes a light source 161 having a low coherence instead of the light source 1, and does not include the partial light shielding plate 62. The other constituent elements of the optical head device 160 are identical to those of the optical head device 50.

The light beam 10 which is emitted from the light source 161 reaches the photodetector 30 through a distance which varies by a distance of 2×d1×n depending on whether it is reflected at the information recording layer 21b or reflected at the information recording layer 21c. Herein, d1 is the distance between the information recording layers, and n is a refractive index of an intermediate substance between the information recording layers. In order to prevent interference on the photodetector 30, the coherence length L of the light beam 10 which is emitted from the light source 161 needs to be short enough so that no interference occurs because of this difference in distance, i.e., 2·d1·n>L. The length of the coherence length L can be set based on the element designing of the light source 161. Alternatively, the length of the coherence length L can be set by adjusting the harmonic current to be superposed on the driving current which is supplied to the light source 161.

As an example, the coherence length L may be less than 64 µm, assuming that the minimum distance of d1 is 20 µm and that n is 1.60.

In the optical head device 160, it is unnecessary to provide a light shielding section or the like in the forward path of light. Therefore, interference can be prevented without affecting signal reproduction, and a TE signal can be stably obtained.

Embodiment 10

Figure 17:
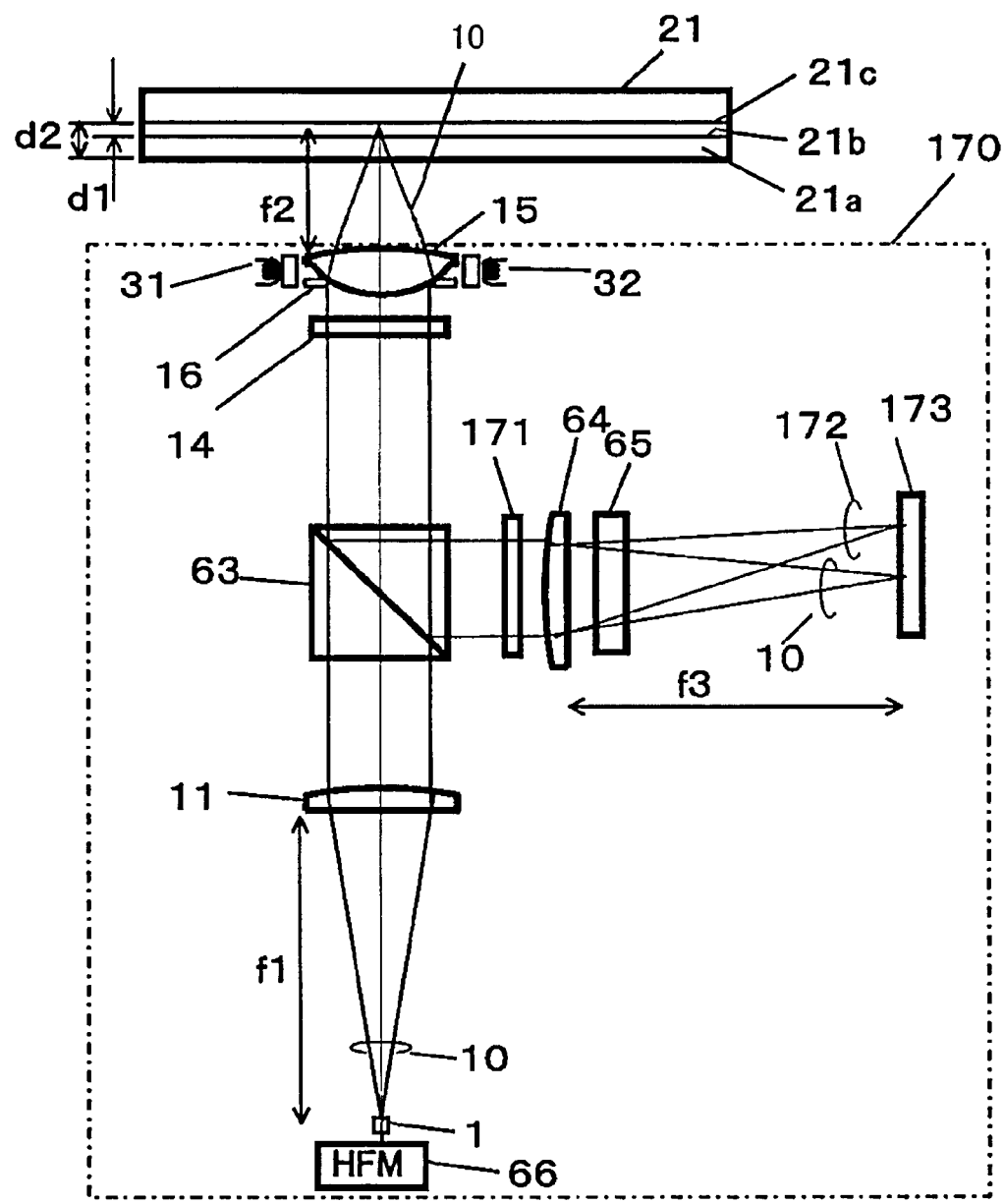
FIG. 17 A diagram showing an optical head device according to Embodiment 10 of the present invention.

Next, with reference to FIG. 17 to FIG. 22, a tenth embodiment of the optical head device according to the present invention will be described. FIG. 17 is a diagram showing an optical head device 170 according to the present embodiment. The optical head device 170 is to be mounted in the optical information processing device 100 instead of the optical head device 50 (FIG. 2). The optical head device 170 includes a photodetector 173 instead of the photodetector 30, and further includes a hologram element 171. The optical head device 170 lacks the diffraction section 61 and the partial light shielding plate 62. The other constituent elements of the optical head device 160 are identical to those of the optical head device 50. The optical head device 170 adopts a one-beam tracking technique to stabilize the tracking signal to be detected.

The light beam 10 which is emitted from the light source 1 passes through the collimator lens 11 and the beam splitter 63, and is converged by the objective lens 15 onto the optical storage medium 21. The light beam 10 having been reflected and diffracted by the optical storage medium 21 again passes through the objective lens 15, and is reflected by the beam splitter 63 so as to enter the hologram element (splitting section) 171. The light beam 10 is split into regions by the hologram element 171, such that portions of the light beam 10 are diffracted to become diffracted light 172. The light beam 10 and the diffracted light beam 172 is converged by the detection lens 64, and enters the photodetector 173 through the cylindrical lens 65.

Figure 18:
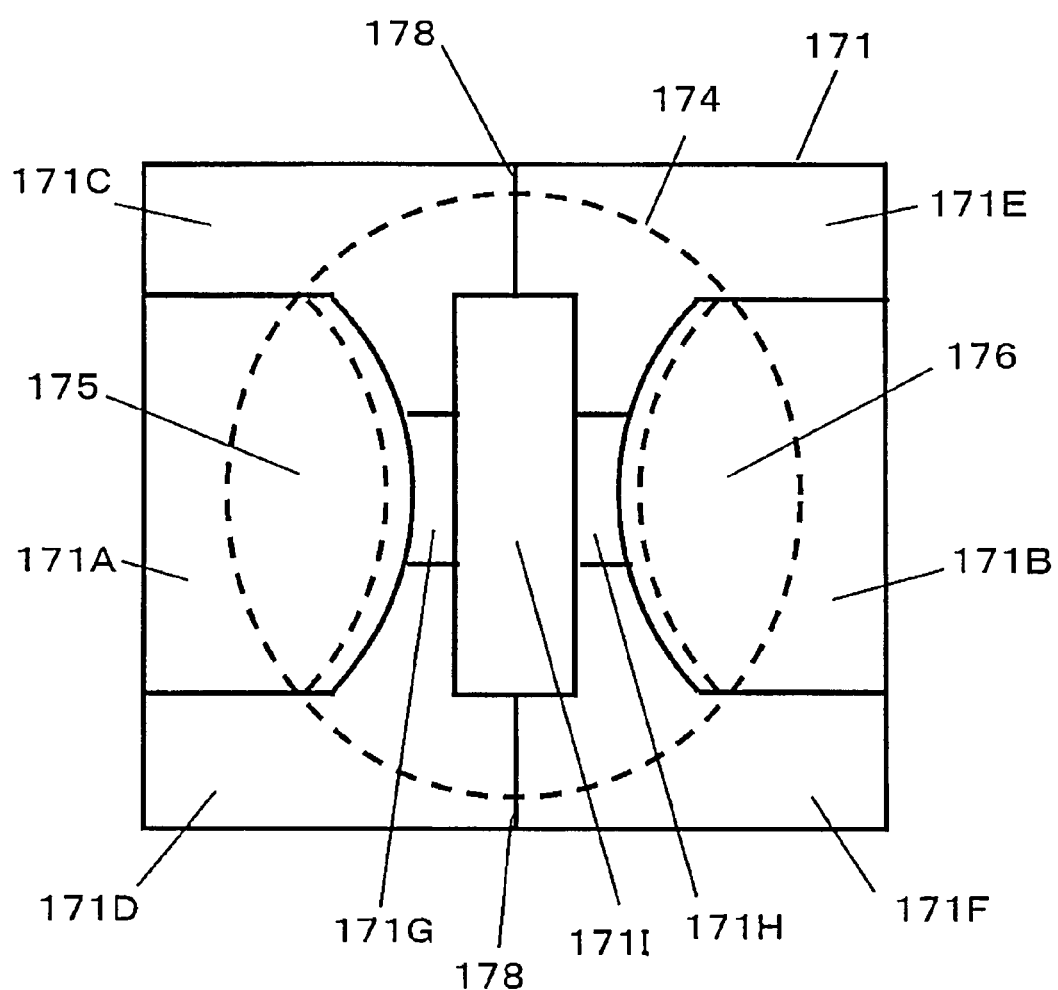
FIG. 18 A diagram showing a hologram element according to Embodiment 10 of the present invention.

FIG. 18 is a front view of the hologram element 171. A cross section of the light beam 10 entering the hologram element 171 is shown by a dotted line 174. The light beam 10 is diffracted when it is reflected by a track on the optical storage medium 21, and contains $0^{th}$ order diffracted light, $+1^{st}$ order diffracted light, and $-1^{st}$ order diffracted light. The light beam 10 contains a first interfering portion 175 in which $0^{th}$ order diffracted light interferes with $+1^{st}$ order diffracted light and a second interfering portion 176 in which $0^{th}$ order diffracted light interferes with $-1^{st}$ order diffracted light.

The hologram element 171 is divided into a plurality of regions. The hologram element 171 includes a first main region 171A which transmits the first interfering portion 175, a second main region 171B which transmits the second interfering portion 176, first sub-regions 171C and 171D, and second sub-regions 171E and 171F.

The first main region 171A and the second main region 171B are symmetrically located with respect to the central portion of the hologram element 171. The first sub-regions 171C and 171D include a swapping section 171G, whereas the second sub-regions 171E and 171F include a swapping section 171H. The swapping sections 171G and 171H will be described in detail later. The first sub-regions 171C and 171D are located so as to surround the outer periphery of the first main region 171A in a C-shape. The second sub-regions 171E and 171F are located so as to surround the outer periphery of the second main region 171B in a C-shape.

The first and second sub-regions 171C to 171F are regions through which the first interfering portion 175 is transmitted with a lower rate than in the first main region 171A and through which the second interfering portion 176 is transmitted with a lower rate than in the second main region 171B. The first and second interfering portions 175 and 176 are hardly transmitted through the first and second sub-regions 171C to 171F. The first sub-regions 171C and 171D and the second sub-regions 171E and 171F are divided by a split line 178. The split line 178 extends along a longitudinal direction of the first and second interfering portions 175 and 176 in the cross section of the light beam 10, such that an extension of the split line 178 passes through a position through which the central portion of the cross section of the light beam 10 is transmitted. The direction along which the split line 178 extends is a direction which is generally parallel to the track direction of a track of the optical storage medium 21 as projected onto the hologram element 171. The hologram element 171 further includes a center dummy region 171I through which the central portion of the cross section of the light beam 10 is transmitted.

Figure 19:
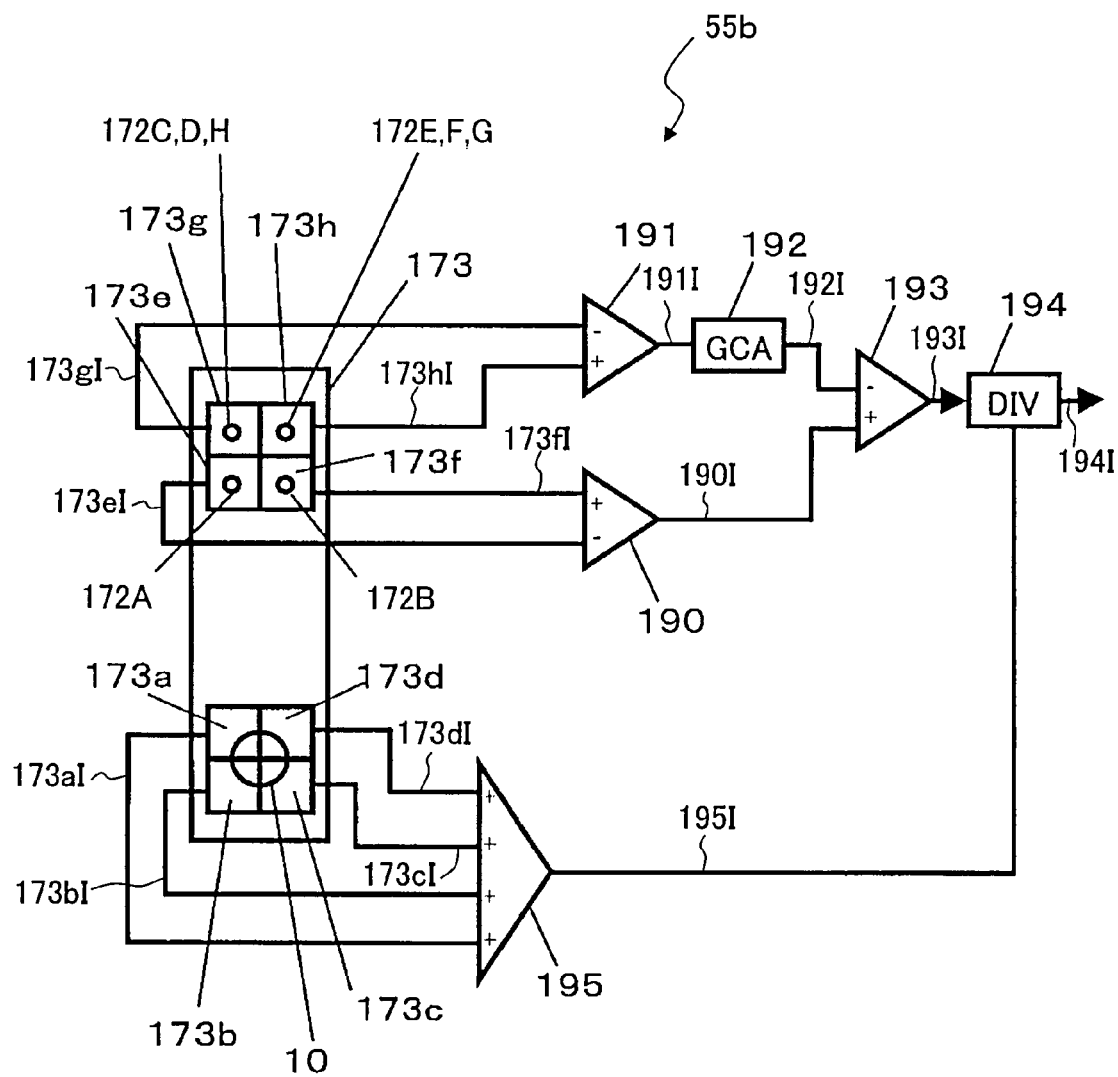
FIG. 19 A diagram showing a relationship between a photodetector and light beams, as well as a signal generation section, according to Embodiment 10 of the present invention.

FIG. 19 is a diagram showing the photodetector 173 and a signal generation section 55b for generating a TE signal. The signal generation section 55b may be provided in the second control section 55 (FIG. 1). With reference to FIG. 18 and FIG. 19, by diffraction, the hologram element 171 splits the light beam 10 into the first and second main light beams 172A and 172B and the first and second sub-light beams 172C to 172F. The first main light beam 172A is a light beam transmitted through the first main region 171A. The second main light beam 172B is a light beam transmitted through the second main region 171B. The first sub-light beams 172C and 172D are light beams transmitted through the first sub-regions 171C and 171D. The second sub-light beams 172E and 172F is a light beam transmitted through the second sub-regions 171E and 171F. The light beam 10 having been transmitted through the center dummy region 171I enters photosensitive portions 173a to 173d of the photodetector 173.

The hologram element 171 further includes the swapping sections 171G and 171H, which diffract the light beam 10 in such a manner that a portion of the first sub-light beams 172C and 172D is swapped with a portion of the second sub-light beams 172E and 172F. The swapping section 171G is located within the first sub-regions 171C and 171D. The swapping section 171H is located within the second sub-regions 171E and 171F. The swapping section 171G is located between the first main region 171A and the center dummy region 171I, whereas the swapping section 171H is located between the second main region 171B and the center dummy region 171I.

The photodetector 173 includes a first photosensitive portion 173e, a second photosensitive portion 173f, a third photosensitive portion 173g, and a fourth photosensitive portion 173h. The first main light beam 172A enters the first photosensitive portion 173e. The second main light beam 172B enters the second photosensitive portion 173f. The first sub-light beams 172C and 172D and a swapped portion 172H of the second sub-light beam enter the same third photosensitive portion 173g. The second sub-light beams 172E and 172F and a swapped portion 172G of the first sub-light beam enter the same fourth photosensitive portion 173h. The light beam 10, which is a dummy light beam having been transmitted through the center dummy region 171I, does not enter the first photosensitive portion 173e to fourth photosensitive portion 173h, but enters the photosensitive portions 173a to 173d.

When generating the TE signal, signals which are obtained by receiving the light beams 172C, 172D and 172H are added in the same polarity, and also, signals which are obtained by receiving the light beams 172E, 172F and 172G are added in the same polarity. Thus, the portion 172G of the first sub-light beam and the portion 172H of the second sub-light beam are swapped across the split line 178 so as to be subjected to calculation.

Now, assume that signals 171AI to 171II are obtained when the laser light having been diffracted by the regions 171A to 171I is each individually received at the photodetector 173. Through a differential calculation 171AI−171BI of the signals corresponding to the main regions, a signal across the track is obtained. Moreover, the signals corresponding to the sub-regions are subjected to a differential calculation of (171CI+171DI+171HI)−(171EI+171FI+171GI). By multiplying the result of the differential calculation corresponding to the sub-regions by a constant k, and taking a difference from the differential calculation corresponding to the main regions, an offset in the TE signal that occurs when the objective lens 15 moves due to track tracking is canceled. As a result, a TE signal which is stable in spite of the moving objective lens 15 can be obtained. The constant k is determined so as to minimize the offset appearing in the TE signal when the objective lens 15 moves.

With reference to FIG. 19, the first photosensitive portion 173e outputs a first signal 173eI which is in accordance with the received light amount. The second photosensitive portion 173f outputs a second signal 173fI which is in accordance with the received light amount. The third photosensitive portion 173g outputs a third signal 173gI which is in accordance with the received light amount. The fourth photosensitive portion 173h outputs a fourth signal 173hI which is in accordance with the received light amount.

The differential calculation section 190 calculates a difference between the signal 173eI and the signal 173fI, and outputs a differential signal 190I. The differential signal 190I is a signal mainly containing a trans-track component. When the objective lens 15 is subjected to tracking in accordance with the eccentricity of the optical storage medium 21, fluctuations in offset will occur in the differential signal 190I that are in accordance with the tracking.

The differential calculation section 191 calculates a difference between the signal 173gI and the signal 173hI, and outputs a differential signal 191I. The differential signal 191I is input to a variable gain amplification section 192, where the gain of the differential signal 191I is adjusted and the differential signal 191I is subjected to an amplification or attenuation to a desired signal intensity. The degree of amplification at this time is k. A signal 192I which is output from the variable gain amplification section 192 has the same fluctuations as the offset fluctuations of the differential signal 190I responsive to tracking. Note that gain adjustment may be performed for the differential signal 190I.

The differential calculation section 193 calculates a difference between the differential signal 190I and the signal 192I, thereby subtracting the offset fluctuations which exist in the differential signal 190I. A differential signal 193I which is output from the differential calculation section 193 is a TE signal which is almost free of offset fluctuations despite tracking. In this state, the signal intensity of the differential signal 193I will change depending on changes in the reflectances of the information recording layers 21b and 21c and in the intensity of the light beam with which the optical storage medium 21 is irradiated, and therefore the differential signal 193I is input to a division section 194 so as to attain a constant amplitude. The signals 173aI to 173dI which are output from the photosensitive portions 173a to 173d are added by an addition section 195. A sum signal 195I which is output from the addition section 195 is input to the division section 194 as a signal with which to perform a division. The sum signal 195I is a signal which is in proportion with the reflectances of the information recording layers 21b and 21c and the intensity of the light beam with which the optical storage medium 21 is irradiated. Thus, a signal 194I which is output from the division section 194 is a TE signal having a desired intensity.

Figure 20:
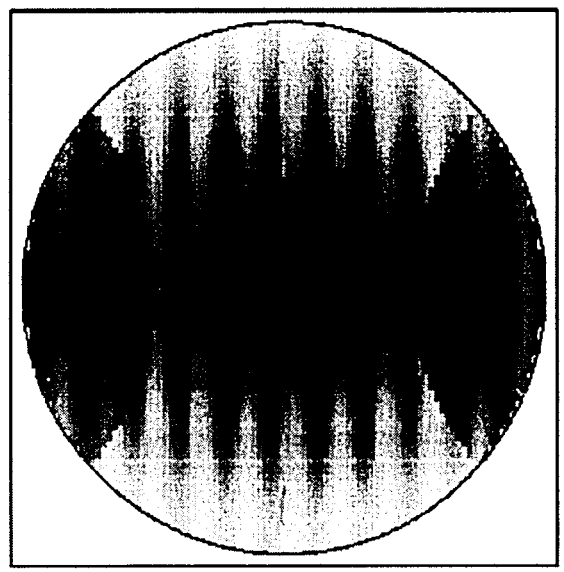
FIG. 20 A diagram showing an exemplary distribution of light entering a hologram element according to Embodiment 10 of the present invention.

Based on the aforementioned features, light having an intenseness/weakness distribution of light amounts along the vertical direction as shown in FIG. 20 enters the hologram element 171, and therefore the TE signal is unlikely to have offsets even when the objective lens 15 moves its position due to tracking. This is because, even if the intenseness/weakness distribution of light amounts shifts from the main region 171A to the sub-regions 171C and 171D due to a move of the objective lens 15, for example, the signal corresponding to the light beam having been transmitted through the swapping section 171G has a reverse polarity, so that generation of offsets in the TE signal is suppressed. Note that such an intenseness/weakness distribution of light amounts may occur due to processing scars of optical elements or diffraction at the edge of an aperture. For example, an intenseness/weakness distribution of light amounts may occur due to processing scars of an optical element having a cylindrical surface or a toric surface (e.g., a beam shaper for applying an intensity distribution correction to a light beam) or diffraction at the edge of an aperture. When manufacturing an optical element having a cylindrical surface or a toric surface, it is not possible to use polishing via rotary motion for the processing of an element surface or die surface. Thus, it is necessary to use polishing via biaxial motion, so that processing scars which run parallel to the axes are likely to remain. Since the light passing through such a processing scar will be refracted in a slightly shifted direction, an intensity distribution will occur in vertical stripes or horizontal stripes. Even when such an optical element is placed in the optical path, the offset in the TE signal can be suppressed by mounting the hologram element 171 in the optical head device, whereby a tracking signal can be stably obtained.

Figure 21:
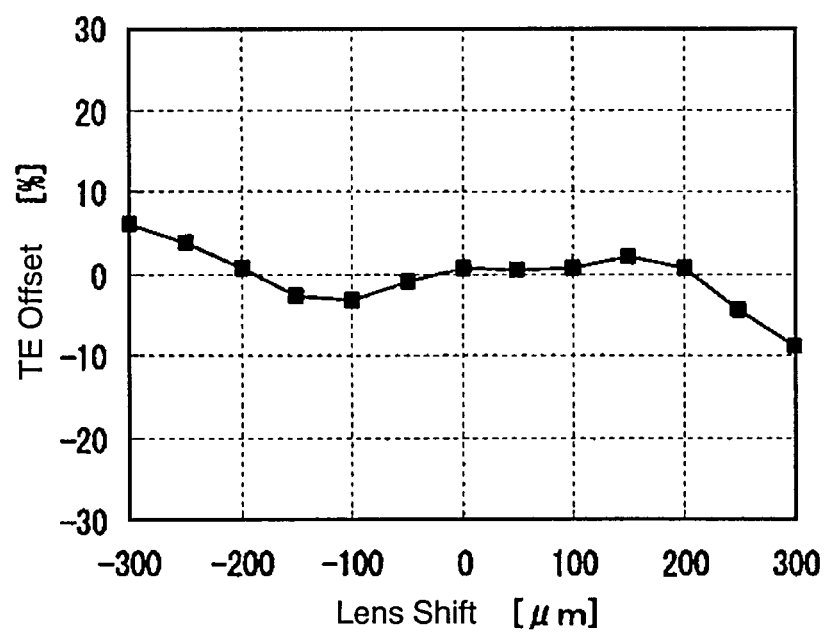
FIG. 21 A diagram showing exemplary offset fluctuations in a tracking signal according to Embodiment 10 of the present invention.
Figure 22:
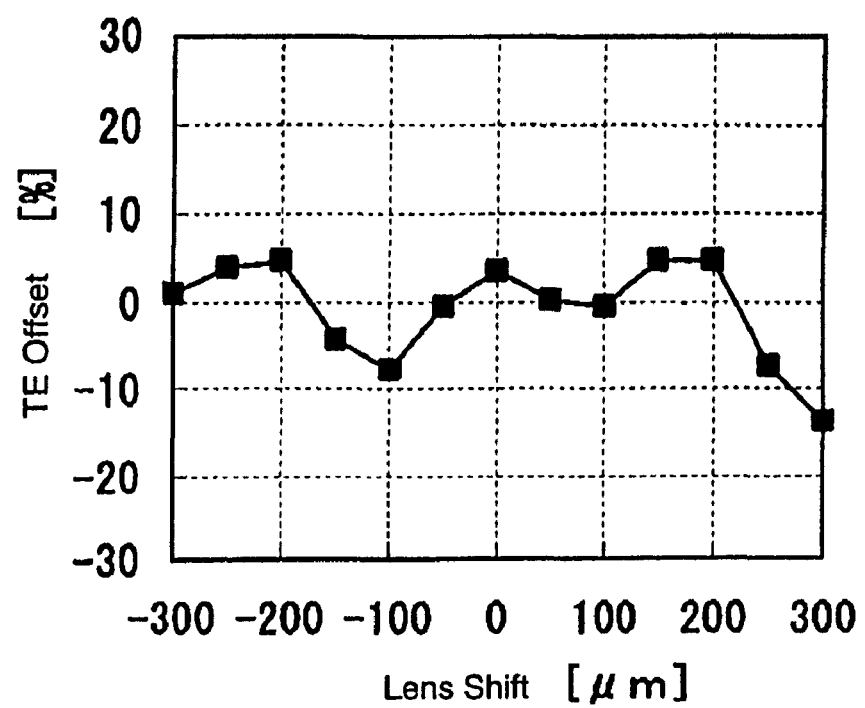
FIG. 22 A diagram showing exemplary offset fluctuations in a tracking signal in a conventional optical head device.

FIG. 21 shows exemplary changes in the offset of a TE signal when the objective lens 15 moves in an optical head device in which the hologram element 171 is mounted. FIG. 22 shows exemplary changes in the offset of a TE signal when an objective lens moves in a conventional optical head device.

In the conventional optical head device, signals corresponding to the light beams having been transmitted through the regions 171C, 171D and 171G are added. Moreover, signals corresponding to the light beams having been transmitted through the regions 171E, 171F and 171H are added. Therefore, when the intenseness/weakness distribution of light amounts is shifted, fluctuations thereof cannot be suppressed, so that the offset in the TE signal will undergo a drastic change.

As shown in FIG. 22, in the conventional optical head device, the offset in the TE signal changes as much as about 15% responsive to a 100 μm move of the lens. On the other hand, as shown in FIG. 21, in the optical head device having the hologram element 171 mounted therein, the change is suppressed to about 5% per 100 μm.

Thus, by mounting the hologram element 171 in the optical head device, an offset in a TE signal that may occur in an apparatus which adopts a one-beam tracking technique can be suppressed, thus making it possible to stably obtain a tracking signal.

Note that, by converging the light beams 10 and 172A to 172H with the detection lens 64 so as to enter the photosensitive portions 173a to 173h, it becomes possible to further suppress the interference between the proper light beam and the stray light, and also to reduce the area of the light-receiving surface of the photodetector 173.

Embodiment 11

Next, with reference to FIG. 23 to FIG. 25, an eleventh embodiment of the optical head device according to the present invention will be described.

Figure 23:
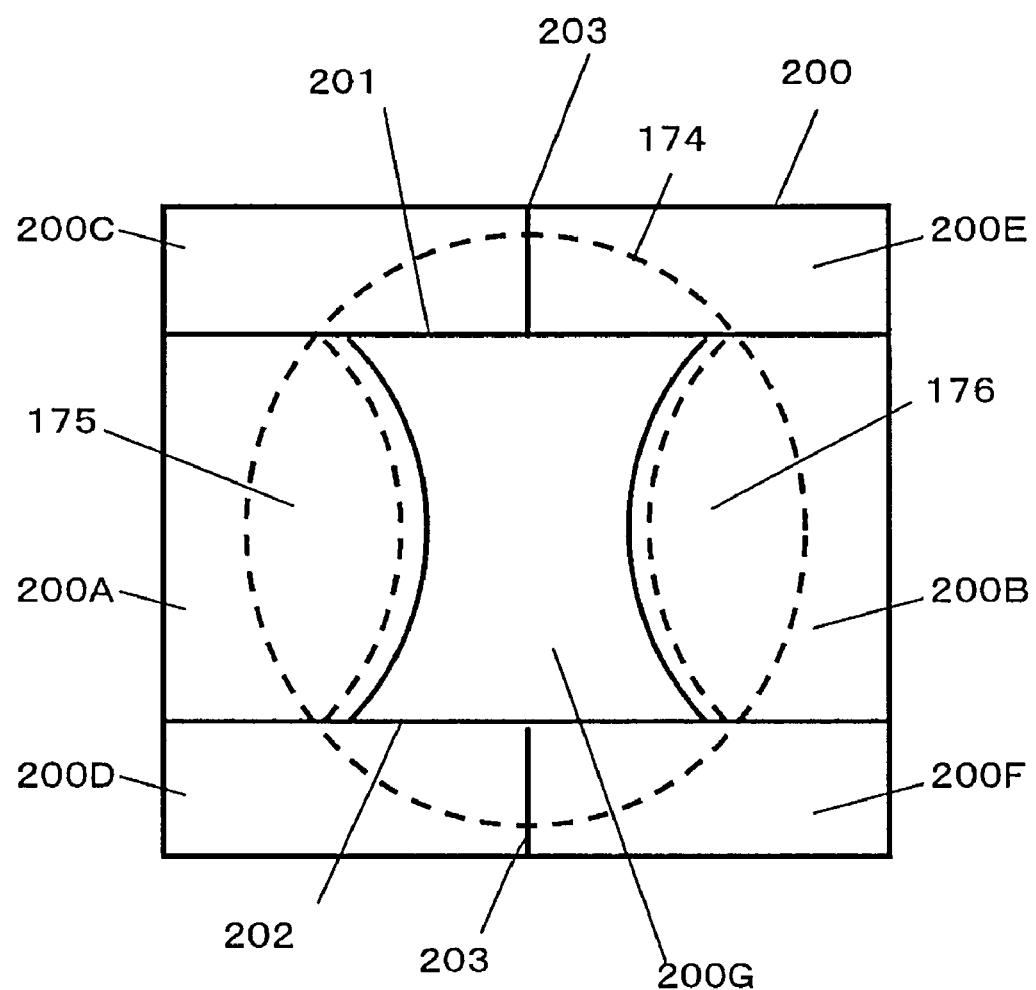
FIG. 23 A diagram showing a hologram element according to Embodiment 11 of the present invention.

FIG. 23 is a diagram showing a hologram element 200 according to the present embodiment. The hologram element 200 is to be mounted in the optical head device 170 instead of the hologram element 171 (FIG. 18).

FIG. 23 is a front view of the hologram element 200. A cross section of the light beam 10 entering the hologram element 200 is shown by a dotted line 174. The light beam 10 contains a first interfering portion 175 and a second interfering portion 176.

The hologram element 200 (splitting section) is divided into a plurality of regions. The hologram element 200 includes a first main region 200A which transmits the first interfering portion 175, a second main region 200B which transmits the second interfering portion 176, first sub-regions 200C and 200D, and second sub-regions 200E and 200F.

The first main region 200A and the second main region 200B are symmetrically located with respect to the central portion of the hologram element 200. The first sub-regions 200C and 200D are located along the longitudinal direction of the first and second interfering portions 175 and 176 in the cross section of the light beam 10, with the first main region 200A being interposed therebetween. The first sub-regions 200E and 200F are located along the longitudinal direction of the first and second interfering portions 175 and 176, with the second main region 200B being interposed therebetween.

The first and second sub-regions 200C to 200F are regions through which the first interfering portion 175 is transmitted with a lower rate than in the first main region 200A and through which the second interfering portion 176 is transmitted with a lower rate than in the second main region 200B. The first and second interfering portions 175 and 176 are hardly transmitted through the first and second sub-regions 200C to 200F.

The first sub-regions 200C and 200D and the second sub-regions 200E and 200F are divided by a split line 203. The split line 203 extends along the longitudinal direction of the first and second interfering portions 175 and 176 in the cross section of the light beam 10, such that an extension of the split line 203 passes through a position through which the central portion of the cross section of the light beam 10 is transmitted. The direction along which the split line 203 extends is a direction which is generally parallel to the track direction of a track of the optical storage medium 21 as projected onto the hologram element 200. The hologram element 200 further includes a center dummy region 200G through which the central portion of the cross section of the light beam 10 is transmitted.

The center dummy region 200G is surrounded by the split lines 201 and 202 and the main regions 200A and 200B. The split lines 201 and 202 extend so as to bridge across the main regions 200A and 200B. The sub-regions 200C to 200F are placed outside the split lines 201 and 202. The center dummy region 200G is positioned so as to include the central portion of the hologram element 200, and is surrounded by the sub-regions 200C to 200F and the main regions 200A and 200B.

Figure 24:
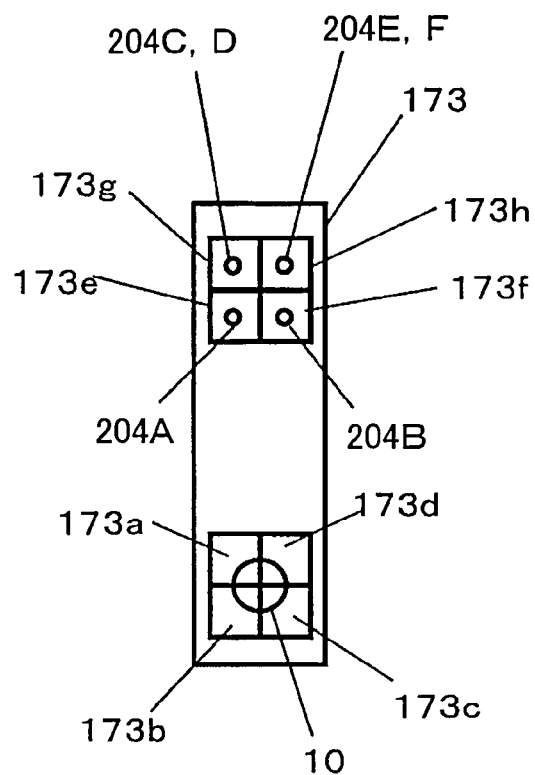
FIG. 24 A diagram showing a relationship between a photodetector and light beams according to Embodiment 11 of the present invention.

FIG. 24 is a diagram showing the photodetector 173. With reference to FIG. 23 and FIG. 24, by diffraction, the hologram element 200 splits the light beam 10 into first and second main light beams 204A and 204B and first and second sub-light beams 204C to 204F. The first main light beam 204A is a light beam transmitted through the first main region 200A. The second main light beam 204B is a light beam transmitted through the second main region 200B. The first sub-light beams 204C and 204D are light beams transmitted through the first sub-regions 200C and 200D. The second sub-light beams 204E and 204F are light beams transmitted through the second sub-regions 200E and 200F. The light beam 10 having been transmitted through the center dummy region 200G enters photosensitive portions 173a to 173d.

The first main light beam 204A enters a first photosensitive portion 173e. The second main light beam 204B enters a second photosensitive portion 173f. The first sub-light beams 204C and 204D enter a third photosensitive portion 173g. The second sub-light beams 204E and 204F enter a fourth photosensitive portion 173h. The light beam 10, which is a dummy light beam having been transmitted through the center dummy region 200G, does not enter the first photosensitive portion 173e to fourth photosensitive portion 173h, but enters the photosensitive portions 173a to 173d.

Next, a method for generating a tracking signal will be described. Assume that signals 200AI to 200GI are obtained when light having been diffracted by the regions 200A to 200G is each individually received at the photodetector 173. Through a differential calculation 200AI−200BI of the signals corresponding to the main regions 200A and 200B, a signal across the track is obtained. Moreover, the signals corresponding to the sub-regions are subjected to a differential calculation of (200CI+200DI)−(200EI+200FI). By multiplying the differential calculation corresponding to the sub-regions by a constant k2, and taking a difference from the differential calculation corresponding to the main regions, an offset in the TE signal that occurs when the objective lens 15 moves due to track tracking is canceled. As a result, a TE signal which is stable in spite of the moving objective lens 15 can be obtained. The constant k2 is determined so as to minimize the offset appearing in the TE signal when the objective lens 15 moves.

As has been described with reference to FIG. 19, the photosensitive portions 173a to 173h respectively output signals 173aI to 173hI which are in accordance with the received light amounts. The calculation methods for the signals 173aI to 173hI are similar to the methods which have been described with reference to FIG. 19.

Based on the aforementioned features, light having an intenseness/weakness distribution of light amounts along the vertical direction as shown in FIG. 20 enters the hologram element 200, and therefore the TE signal is unlikely to have offsets even when the objective lens 15 moves its position due to tracking. This is because, even if the intenseness/weakness distribution of light amounts shifts from the main region 200A to the center dummy region 200G due to a move of the objective lens 15, for example, the light beam having been transmitted through the center dummy region 200G is not used for the generation of the TE signal, so that generation of offsets in the tracking signal is suppressed.

Figure 25:
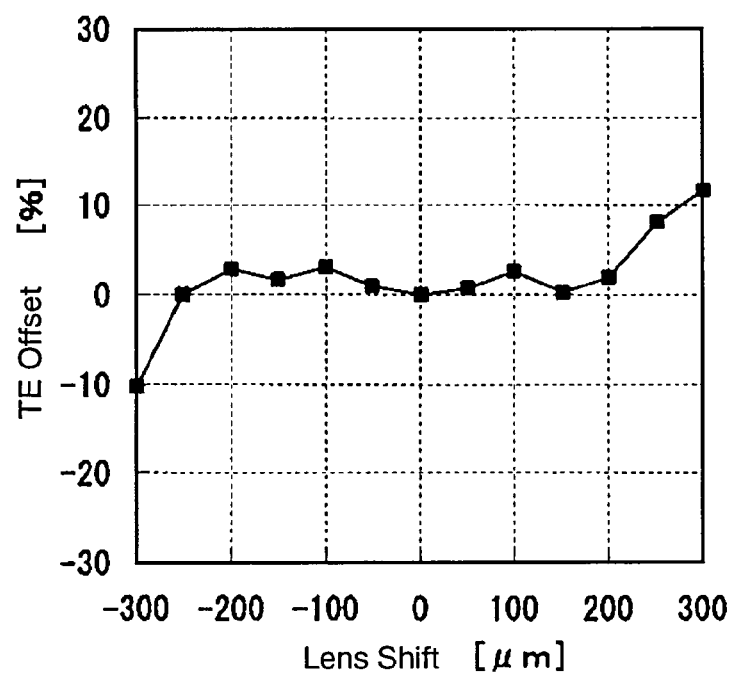
FIG. 25 A diagram showing exemplary offset fluctuations in a tracking signal according to Embodiment 11 of the present invention.
Figure 26:
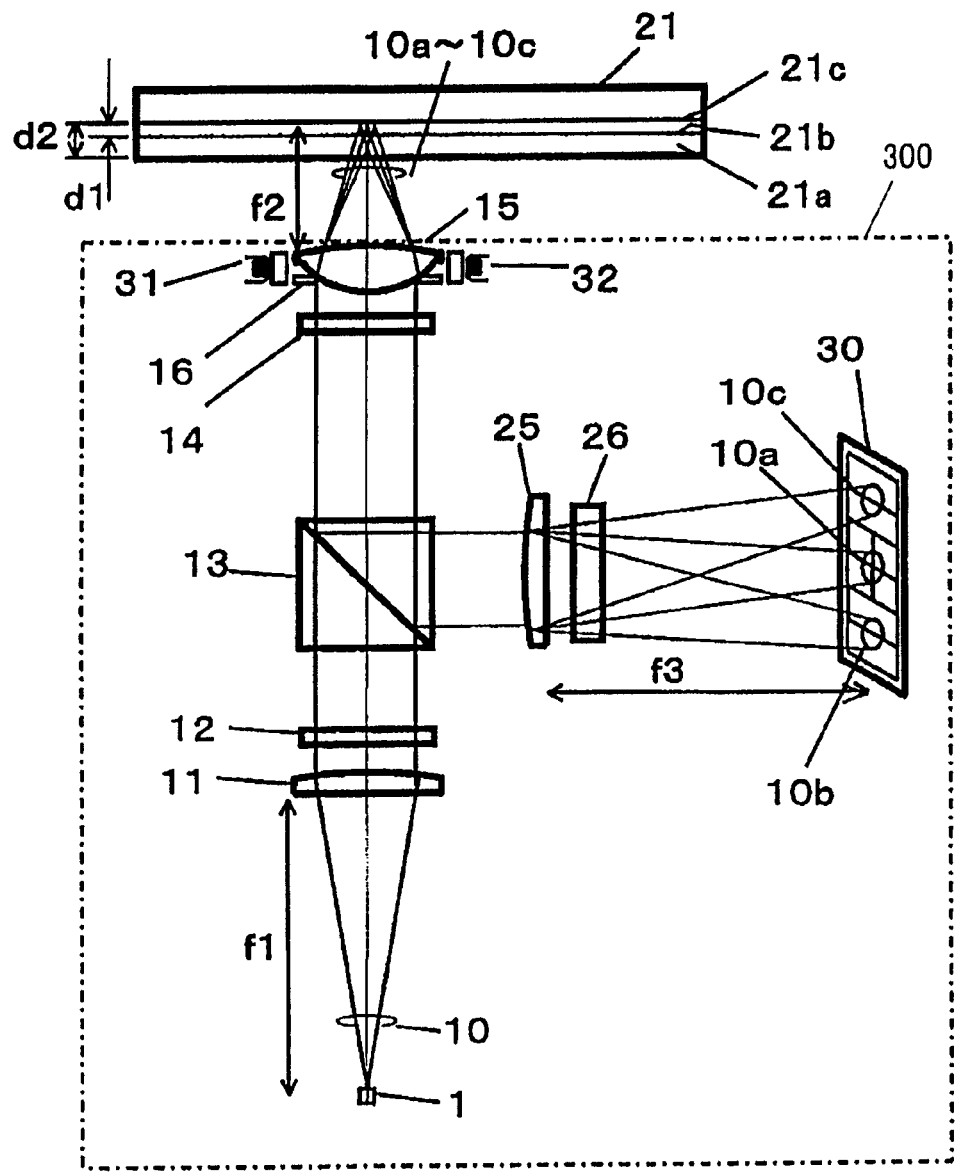
FIG. 26 A diagram showing a conventional optical head device.

FIG. 25 shows exemplary changes in the offset of a TE signal when the objective lens 15 moves in an optical head device in which the hologram element 200 is mounted. By using the hologram element 200, the offset in the TE signal is suppressed to about 3% responsive to a 100 μm move of the lens.

With reference to FIG. 23, a length of the cross section of the light beam 10 that overlaps each of the main regions 200A and 200B along the horizontal direction accounts for 30% of the diameter of the light beam 10. As a result, the width of the narrower part of the center dummy region 200G along the horizontal direction has a length which is 40% of the light beam diameter. Assuming that the objective lens 15 has an NA of 0.85; the track pitch is 0.32 μm; and the laser light has a wavelength of 405 nm, the lateral width of each of the interference regions 175 and 176 is about 25% of the light beam diameter. Herein, by allowing for a margin in the case where the objective lens 15 has moved due to tracking in accordance with the eccentricity of the track, a length of the cross section of the light beam 10 that overlaps each of the main regions 200A and 200B along the horizontal direction is prescribed to be 30% of the diameter of the light beam 10. This proportion is also an optimum proportion for suppressing the offset in the tracking signal that may occur at any boundary between a region in which information is already recorded on the optical storage medium 21 and a region in which information is unrecorded. The most preferable length of the cross section of the light beam 10 that overlaps the main regions 200A and 200B along the horizontal direction is (width of the interference region)+0 to 5%, where 0 to 5% represents a ratio against the light beam diameter.

Thus, by mounting the hologram element 200 in the optical head device, an offset in a TE signal that may occur in an apparatus which adopts a one-beam tracking technique can be suppressed, thus making it possible to stably obtain a tracking signal.

Note that, by converging the light beams 10 and 204A to 204F with the detection lens 64 so as to enter the photosensitive portions 173a to 173h, it becomes possible to further suppress the interference between the proper light beam and the stray light, and also to reduce the area of the light-receiving surface of the photodetector 173.

Thus, as described above, an optical head device according to the present invention is an optical head device comprising: a light source for emitting a light beam; a converging section for converging the light beam onto an optical storage medium having a track; a splitting section for splitting the light beam having been reflected from the optical storage medium; and a photodetection section for receiving the split light beams and outputting signals which are in accordance with received light amounts, wherein, the reflected light beam contains $0^{th}$ order diffracted light, $+1^{st}$ order diffracted light and $-1^{st}$ order diffracted light; the reflected light beam includes a first interfering portion in which the $0^{th}$ order diffracted light interferes with the $+1^{st}$ order diffracted light and a second interfering portion in which the $0^{th}$ order diffracted light interferes with the $-1^{st}$ order diffracted light; the splitting section includes a first main region transmitting the first interfering portion, a second main region transmitting the second interfering portion, and first and second sub-regions through which the first interfering portion is transmitted with a lower rate than in the first main region and through which the second interfering portion is transmitted with a lower rate than in the second main region; the first sub-region and the second sub-region are divided by a split line extending in a longitudinal direction of the first and second interfering portions in a cross section of the reflected light beam; the splitting section splits the reflected light beam into a first main light beam transmitted through the first main region, a second main light beam transmitted through the second main region, a first sub-light beam transmitted through the first sub-region, and a second sub-light beam transmitted through the second sub-region; and the splitting section further includes a swapping section for swapping a portion of the first sub-light beam with a portion of the second sub-light beam.

In one embodiment, the photodetection section comprises a first photosensitive portion, a second photosensitive portion, a third photosensitive portion, and a fourth photosensitive portion; the first main light beam enters the first photosensitive portion; the second main light beam enters the second photosensitive portion; the first sub-light beam and the swapped portion of the second sub-light beam enter the same third photosensitive portion; and the second sub-light beam and the swapped portion of the first sub-light beam enter the same fourth photosensitive portion.

In one embodiment, the split line passes through a position on the splitting section through which a central portion of the cross section of the reflected light beam is transmitted.

In one embodiment, the splitting section further includes a center dummy region through which a central portion of the cross section of the reflected light beam is transmitted; the splitting section further splits the reflected light beam into a dummy light beam having been transmitted through the center dummy region; and the dummy light beam does not enter the first to fourth photosensitive portions.

In one embodiment, a pair of said swapping sections is comprised, wherein, one of the swapping sections is positioned between the first main region and the center dummy region; and the other swapping section is positioned between the second main region and the center dummy region.

An optical information processing device according to the present invention comprises: the aforementioned optical head device; and a control section for controlling the optical head device based on signals which are output from the photosensitive portions.

An optical information processing device according to the present invention comprises: the aforementioned optical head device; and a control section for controlling the optical head device based on signals which are output from the photosensitive portions, wherein, the first photosensitive portion entered by the first main light beam outputs a first signal which is in accordance with a received light amount; the second photosensitive portion entered by the second main light beam outputs a second signal which is in accordance with a received light amount; the third photosensitive portion entered by the first sub-light beam and the swapped portion of the second sub-light beam outputs a third signal which is in accordance with a received light amount; the fourth photosensitive portion entered by the second sub-light beam and the swapped portion of the first sub-light beam outputs a fourth signal which is in accordance with a received light amount; and the optical information processing device further comprises a generation section for generating a tracking error signal, the generation section including a first differential calculation section for calculating a difference between the first signal and the second signal to generate a first differential signal, a second differential calculation section for calculating a difference between the third signal and the fourth signal to generate a second differential signal, an adjustment section for adjusting a gain of at least one of the first differential signal and the second differential signal, and a third differential calculation section for calculating a difference between the first differential signal and the second differential signal to generate a third differential signal.

An optical head device according to the present invention is an optical head device comprising: a light source for emitting a light beam; a converging section for converging the light beam onto an optical storage medium having a track; a splitting section for splitting the light beam having been reflected from the optical storage medium; and a photodetection section for receiving the split light beams and outputting signals which are in accordance with received light amounts, wherein, the reflected light beam contains $0^{th}$ order diffracted light, $+1^{st}$ order diffracted light and $-1^{st}$ order diffracted light; the reflected light beam includes a first interfering portion in which the $0^{th}$ order diffracted light interferes with the $+1^{st}$ order diffracted light and a second interfering portion in which the $0^{th}$ order diffracted light interferes with the $-1^{st}$ order diffracted light; the splitting section includes a first main region transmitting the first interfering portion, a second main region transmitting the second interfering portion, and first and second sub-regions through which the first interfering portion is transmitted with a lower rate than in the first main region and through which the second interfering portion is transmitted with a lower rate than in the second main region; the first sub-region and the second sub-region are divided by a split line extending in a longitudinal direction of the first and second interfering portions in a cross section of the reflected light beam; the splitting section further includes a center dummy region through which a central portion of the cross section of the reflected light beam is transmitted; the center dummy region is surrounded by the first and second main regions and the first and second sub-regions; the splitting section splits the reflected light beam into a first main light beam transmitted through the first main region, a second main light beam transmitted through the second main region, a first sub-light beam transmitted through the first sub-region, a second sub-light beam transmitted through the second sub-region, and a dummy light beam transmitted through the center dummy region; the photodetection section includes a first photosensitive portion, a second photosensitive portion, a third photosensitive portion, and a fourth photosensitive portion; the first main light beam enters the first photosensitive portion; the second main light beam enters the second photosensitive portion; the first sub-light beam enters the third photosensitive portion; the second sub-light beam enters the fourth photosensitive portion; and the dummy light beam does not enter the first to fourth photosensitive portions.

An optical information processing device according to the present invention comprises: the aforementioned optical head device; and a control section for controlling the optical head device based on signals which are output from the photosensitive portions.

In one embodiment, the first photosensitive portion entered by the first main light beam outputs a first signal which is in accordance with a received light amount; the second photosensitive portion entered by the second main light beam outputs a second signal which is in accordance with a received light amount; the third photosensitive portion entered by the first sub-light beam outputs a third signal which is in accordance with a received light amount; the fourth photosensitive portion entered by the second sub-light beam outputs a fourth signal which is in accordance with a received light amount; and the device further comprises a generation section for generating a tracking error signal, the generation section including a first differential calculation section for calculating a difference between the first signal and the second signal to generate a first differential signal, a second differential calculation section for calculating a difference between the third signal and the fourth signal to generate a second differential signal, an adjustment section for adjusting a gain of at least one of the first differential signal and the second differential signal, and a third differential calculation section for calculating a difference between the first differential signal and the second differential signal to generate a third differential signal.

An optical head device according to the present invention is an optical head device comprising: a light source for emitting a light beam; a diffraction section for generating a plurality of diffracted light beams from the light beam; a converging section for converging the plurality of diffracted light beams onto an optical storage medium; a splitting section for splitting the plurality of diffracted light beams having been reflected from the optical storage medium; and a photodetection section for receiving the plurality of split diffracted light beams and outputting signals which are in accordance with received light amounts, wherein, the plurality of diffracted light beams include a main light beam which is $0^{th}$ order diffracted light and first and second sub-light beams which are $1^{st}$ order or any higher-order diffracted light; and the optical head device further comprises a partial light shielding section provided in an optical path between the light source and the converging section to block a portion of the main light beam.

In one embodiment, the partial light shielding section blocks a portion including a central portion of a cross section of the main light beam.

In one embodiment, the optical storage medium includes a plurality of recording layers; and the portion of the main light beam blocked by the partial light shielding section corresponds to a portion of the main light beam to enter a photosensitive portion of the photodetection section after having been reflected by a recording layer other than a predetermined recording layer when a focal point of the main light beam is set to the predetermined recording layer.

In one embodiment, the partial light shielding section blocks two portions which are in symmetric positions with respect to a central portion of a cross section of the main light beam.

In one embodiment, the optical storage medium includes a plurality of recording layers; the photodetection section includes a first photosensitive portion and second and third photosensitive portions which are in symmetric positions with respect to the first photosensitive portion; and the portion of the main light beam blocked by the partial light shielding section corresponds to portions of the main light beam to enter the second and third photosensitive portions after having been reflected by a recording layer other than a predetermined recording layer when a focal point of the main light beam is set to the predetermined recording layer.

In one embodiment, a collimating lens provided in an optical path between the light source and the partial light shielding section is further comprised, the collimating lens converting the light beam emitted from the light source into a collimated light beam, wherein, the partial light shielding section blocks a portion of the collimated light beam.

An optical information processing device according to the present invention comprises: the aforementioned optical head device; and a control section for controlling the optical head device based on signals which are output from the photosensitive portions.

An optical head device according to the present invention is an optical head device comprising: a light source for emitting a light beam; a diffraction section for generating a plurality of diffracted light beams from the light beam; a converging section for converging the plurality of diffracted light beams onto an optical storage medium; a splitting section for splitting the plurality of diffracted light beams having been reflected from the optical storage medium; and a photodetection section for receiving the plurality of split diffracted light beams and outputting signals which are in accordance with received light amounts, wherein, the plurality of diffracted light beams include a main light beam which is $0^{th}$ order diffracted light and first and second sub-light beams which are $1^{st}$ order or any higher-order diffracted light; and the diffraction section includes a first partial diffraction section generating more of the main light beam than the first and second sub-light beams, and a second partial diffraction section generating more of the first and second sub-light beams than the main light beam.

In one embodiment, a pair of said second partial diffraction sections is comprised, wherein, the pair of second partial diffraction section are in symmetric positions with respect to a central portion of a cross section of the light beam entering the diffraction section.

An optical information processing device according to the present invention comprises: the aforementioned optical head device; and a control section for controlling the optical head device based on signals which are output from the photosensitive portions.

An optical head device according to the present invention is an optical head device comprising: a light source for emitting a light beam; a diffraction section for generating a plurality of diffracted light beams from the light beam; a converging section for converging the plurality of diffracted light beams onto an optical storage medium; a splitting section for splitting the plurality of diffracted light beams having been reflected from the optical storage medium; and a photodetection section for receiving the plurality of split diffracted light beams and outputting signals which are in accordance with received light amounts, wherein, the plurality of diffracted light beams include a main light beam which is $0^{th}$ order diffracted light and first and second sub-light beams which are $1^{st}$ order or any higher-order diffracted light; the diffraction section includes a first partial diffraction section generating more of the main light beam than the first and second sub-light beams, and a second partial diffraction section generating the main light beam with a higher rate than the first partial diffraction section; and the second partial diffraction section is placed in a position where a central portion of a cross section of the light beam entering the diffraction section passes through.

In one embodiment, no diffraction grating is provided in the second partial diffraction section.

An optical information processing device according to the present invention comprises: the aforementioned optical head device; and a control section for controlling the optical head device based on signals which are output from the photosensitive portions.

An optical head device according to the present invention is an optical head device to be mounted in an apparatus for generating a tracking error signal by using a main light beam and a sub-light beam, the optical head device including: a first light source for emitting the main light beam; a second light source for emitting the sub-light beam; a converging section for converging the main light beam and the sub-light beam onto an optical storage medium; a splitting section for splitting the main light beam and the sub-light beam having been reflected from the optical storage medium; and a photodetection section for receiving the split main light beams and sub-light beams and outputting signals which are in accordance with received light amounts, wherein, the main light beam and the sub-light beam have different wavelengths.

An optical information processing device according to the present invention comprises: the aforementioned optical head device; and a control section for controlling the optical head device based on signals which are output from the photosensitive portions.

An optical head device according to the present invention is an optical head device comprising: a light source for emitting a light beam; a diffraction section for generating a plurality of diffracted light beams from the light beam; a converging section for converging the plurality of diffracted light beams onto an optical storage medium; a splitting section for splitting the plurality of diffracted light beams having been reflected from the optical storage medium; and a photodetection section for receiving the plurality of split diffracted light beams and outputting signals which are in accordance with received light amounts, wherein, the diffraction section includes a diffraction grating; and the optical head device further includes a swing section for causing the diffraction section to swing in a direction which is perpendicular to a direction along which grooves of the diffraction grating extend.

The optical information processing device according to the present invention comprises: the aforementioned optical head device; and a control section for controlling the optical head device based on signals which are output from the photosensitive portions.

An optical head device according to the present invention is an optical head device comprising: a light source for emitting a light beam; a diffraction section for generating a plurality of diffracted light beams from the light beam; a converging section for converging the plurality of diffracted light beams onto an optical storage medium; a splitting section for splitting the plurality of diffracted light beams having been reflected from the optical storage medium; and a photodetection section for receiving the plurality of split diffracted light beams and outputting signals which are in accordance with received light amounts, wherein, the optical storage medium includes a plurality of recording layers; and $2 \cdot d \cdot n > L$ is satisfied, where L is a coherence length of the light beam emitted from the light source; d is a distance between two recording layers; and n is a refractive index of a medium which is located between the two recording layers.

An optical information processing device according to the present invention comprises: the aforementioned optical head device; and a control section for controlling the optical head device based on signals which are output from the photosensitive portions.

INDUSTRIAL APPLICABILITY

An optical head device and an optical information processing device according to the present invention are particularly useful in the field of technology where optical recording and/or reproduction of data is performed.

The invention claimed is:
1. An optical head device comprising:
a light source for emitting a light beam;
a converging section for converging the light beam onto an optical storage medium having a track;
a splitting section for splitting the light beam having been reflected from the optical storage medium; and
a photodetection section for receiving the split light beams and outputting signals which are in accordance with received light amounts, wherein, the reflected light beam contains $0^{th}$ order diffracted light, $+1^{st}$ order diffracted light and $-1^{st}$ order diffracted light;
the reflected light beam includes a first interfering portion in which the $0^{th}$ order diffracted light interferes with the $+1^{st}$ order diffracted light and a second interfering portion in which the $0^{th}$ order diffracted light interferes with the $-1^{st}$ order diffracted light;
the splitting section includes
a first main region transmitting the first interfering portion,
a second main region transmitting the second interfering portion, and
first and second sub-regions through which the first interfering portion is transmitted with a lower rate than in the first main region and through which the second interfering portion is transmitted with a lower rate than in the second main region;
the first sub-region and the second sub-region are divided by a split line extending in a longitudinal direction of the first and second interfering portions in a cross section of the reflected light beam;
the splitting section further includes a center dummy region through which a central portion of the cross section of the reflected light beam is transmitted;
the center dummy region is surrounded by the first and second main regions and the first and second sub-regions;
the splitting section splits the reflected light beam into
a first main light beam transmitted through the first main region,
a second main light beam transmitted through the second main region,
a first sub-light beam transmitted through the first sub-region,
a second sub-light beam transmitted through the second sub-region, and
a dummy light beam transmitted through the center dummy region;
the photodetection section includes a first photosensitive portion, a second photosensitive portion, a third photosensitive portion, and a fourth photosensitive portion;
the first main light beam enters the first photosensitive portion;
the second main light beam enters the second photosensitive portion;

the first sub-light beam enters the third photosensitive portion;

the second sub-light beam enters the fourth photosensitive portion; and the dummy light beam does not enter the first to fourth photosensitive portions.

2. An optical information processing device comprising:
the optical head device of claim 1; and
a control section for controlling the optical head device based on signals which are output from the photosensitive portions.

3. The optical information processing device of claim 2, wherein,
the first photosensitive portion entered by the first main light beam outputs a first signal which is in accordance with a received light amount;
the second photosensitive portion entered by the second main light beam outputs a second signal which is in accordance with a received light amount;
the third photosensitive portion entered by the first sub-light beam outputs a third signal which is in accordance with a received light amount;
the fourth photosensitive portion entered by the second sub-light beam outputs a fourth signal which is in accordance with a received light amount; and
the device further comprises a generation section for generating a tracking error signal,
the generation section including
a first differential calculation section for calculating a difference between the first signal and the second signal to generate a first differential signal,
a second differential calculation section for calculating a difference between the third signal and the fourth signal to generate a second differential signal,
an adjustment section for adjusting a gain of at least one of the first differential signal and the second differential signal, and
a third differential calculation section for calculating a difference between the first differential signal and the second differential signal to generate a third differential signal.

4. An optical head device comprising:
a light source for emitting a light beam;
a diffraction section for generating a plurality of diffracted light beams from the light beam;
a converging section for converging the plurality of diffracted light beams onto an optical storage medium;
a splitting section for splitting the plurality of diffracted light beams having been reflected from the optical storage medium; and
a photodetection section for receiving the plurality of split diffracted light beams and outputting signals which are in accordance with received light amounts, wherein,
the plurality of diffracted light beams include a main light beam which is $0^{th}$ order diffracted light and first and second sub-light beams which are $1^{st}$ order or any higher-order diffracted light; and
the diffraction section includes
a first partial diffraction section generating more of the main light beam than the first and second sub-light beams, and
a second partial diffraction section generating more of the first and second sub-light beams than the main light beam.

5. The optical head device of claim 4, comprising a pair of said second partial diffraction sections, wherein,
the pair of second partial diffraction section are in symmetric positions with respect to a central portion of a cross section of the light beam entering the diffraction section.

6. An optical information processing device comprising:
the optical head device of claim 4; and
a control section for controlling the optical head device based on signals which are output from the photosensitive portions.

7. An optical head device comprising:
a light source for emitting a light beam;
a diffraction section for generating a plurality of diffracted light beams from the light beam;
a converging section for converging the plurality of diffracted light beams onto an optical storage medium;
a splitting section for splitting the plurality of diffracted light beams having been reflected from the optical storage medium; and
a photodetection section for receiving the plurality of split diffracted light beams and outputting signals which are in accordance with received light amounts, wherein,
the plurality of diffracted light beams include a main light beam which is $0^{th}$ order diffracted light and first and second sub-light beams which are $1^{st}$ order or any higher-order diffracted light;
the diffraction section includes
a first partial diffraction section generating more of the main light beam than the first and second sub-light beams, and
a second partial diffraction section generating the main light beam with a higher rate than the first partial diffraction section; and
the second partial diffraction section is placed in a position where a central portion of a cross section of the light beam entering the diffraction section passes through.

8. The optical head device of claim 7, wherein no diffraction grating is provided in the second partial diffraction section.

9. An optical information processing device comprising:
the optical head device of claim 7; and
a control section for controlling the optical head device based on signals which are output from the photosensitive portions.

10. An optical head device to be mounted in an apparatus for generating a tracking error signal by using a main light beam and a sub-light beam,
the optical head device including:
a first light source for emitting the main light beam;
a second light source for emitting the sub-light beam;
a converging section for converging the main light beam and the sub-light beam onto an optical storage medium;
a splitting section for splitting the main light beam and the sub-light beam having been reflected from the optical storage medium; and
a photodetection section for receiving the split main light beams and sub-light beams and outputting signals which are in accordance with received light amounts, wherein,
the main light beam and the sub-light beam have different wavelengths.

11. An optical information processing device comprising:
the optical head device of claim 10; and
a control section for controlling the optical head device based on signals which are output from the photosensitive portions.

12. An optical head device comprising:
a light source for emitting a light beam;
a diffraction section for generating a plurality of diffracted light beams from the light beam;

a converging section for converging the plurality of diffracted light beams onto an optical storage medium;

a splitting section for splitting the plurality of diffracted light beams having been reflected from the optical storage medium; and a photodetection section for receiving the plurality of split diffracted light beams and outputting signals which are in accordance with received light amounts, wherein, the diffraction section includes a diffraction grating; and the optical head device further includes a swing section for causing the diffraction section to swing in a direction which is perpendicular to a direction along which grooves of the diffraction grating extend.

13. An optical information processing device comprising:

the optical head device of claim 12; and a control section for controlling the optical head device based on signals which are output from the photosensitive portions.

14. An optical head device comprising:

a light source for emitting a light beam;

a diffraction section for generating a plurality of diffracted light beams from the light beam;

a converging section for converging the plurality of diffracted light beams onto an optical storage medium;

a splitting section for splitting the plurality of diffracted light beams having been reflected from the optical storage medium; and a photodetection section for receiving the plurality of split diffracted light beams and outputting signals which are in accordance with received light amounts, wherein, the optical storage medium includes a plurality of recording layers; and $2 \cdot d \cdot n > L$ is satisfied, where L is a coherence length of the light beam emitted from the light source; d is a distance between two recording layers; and n is a refractive index of a medium which is located between the two recording layers.

15. An optical information processing device comprising:

the optical head device of claim 14; and a control section for controlling the optical head device based on signals which are output from the photosensitive portions.

\* \* \* \* \*